United States Patent
Wu et al.

(10) Patent No.: US 10,492,178 B2
(45) Date of Patent: Nov. 26, 2019

(54) CONTROL INFORMATION TRANSMISSION METHOD, BASE STATION, AND USER EQUIPMENT

(71) Applicant: Huawei Technologies Co., Ltd., Shenzhen (CN)

(72) Inventors: Qiang Wu, Beijing (CN); Bingyu Qu, Beijing (CN); Lixia Xue, Beijing (CN); Yongxing Zhou, Beijing (CN); Leiming Zhang, Beijing (CN); Jianqin Liu, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 15/705,585

(22) Filed: Sep. 15, 2017

(65) Prior Publication Data

US 2018/0027541 A1    Jan. 25, 2018

Related U.S. Application Data

(63) Continuation of application No. PCT/CN2015/074294, filed on Mar. 16, 2015.

(51) Int. Cl.
| | |
|---|---|
| *H04W 72/08* | (2009.01) |
| *H04W 72/04* | (2009.01) |
| *H04W 72/12* | (2009.01) |
| *H04L 5/00* | (2006.01) |
| *H04W 88/02* | (2009.01) |
| *H04W 88/08* | (2009.01) |

(52) U.S. Cl.
CPC ....... *H04W 72/0406* (2013.01); *H04L 5/0048* (2013.01); *H04L 5/0055* (2013.01); *H04L 5/0057* (2013.01); *H04W 72/1289* (2013.01); *H04W 88/02* (2013.01); *H04W 88/08* (2013.01)

(58) Field of Classification Search
CPC ......... H04W 72/0406; H04W 72/1289; H04W 88/08; H04W 88/02; H04L 5/0048; H04L 5/0057; H04L 5/0055
See application file for complete search history.

(56) References Cited

U.S. PATENT DOCUMENTS

| | | | |
|---|---|---|---|
| 9,564,978 B2 * | 2/2017 | Jersenius | H04L 1/0026 |
| 10,064,064 B2 * | 8/2018 | Han | H04W 16/14 |
| 10,178,682 B2 * | 1/2019 | Loehr | H04W 72/1284 |

(Continued)

FOREIGN PATENT DOCUMENTS

| CN | 103220690 A | 7/2013 |
|---|---|---|
| CN | 104065453 A | 9/2014 |

(Continued)

*Primary Examiner* — Jay P Patel
(74) *Attorney, Agent, or Firm* — Slater Matsil, LLP

(57) ABSTRACT

A control information sending method, a base station, and user equipment are provided. The method includes: sending, by a base station, first control information to first user equipment; transceiving, by the base station, first data to/from the first user equipment according to the first control information; and sending, by the base station, first trigger information to the first user equipment, where the first trigger information is used to indicate that the base station transceives second data to/from the first user equipment according to partial information or all information of the first control information.

20 Claims, 5 Drawing Sheets

(56) References Cited

U.S. PATENT DOCUMENTS

| | | |
|---|---|---|
| 2009/0279500 A1 | 11/2009 | Luo et al. |
| 2012/0147831 A1* | 6/2012 | Golitschek ............ H04L 1/0026 370/329 |
| 2012/0188978 A1 | 7/2012 | Yan et al. |
| 2012/0307700 A1* | 12/2012 | Nordberg .......... H04W 52/0206 370/311 |
| 2013/0170466 A1* | 7/2013 | Nishio ................. H04L 5/0007 370/329 |
| 2013/0223394 A1* | 8/2013 | Nishio ................. H04L 5/0048 370/329 |
| 2014/0307673 A1 | 10/2014 | Zhou et al. |
| 2015/0049699 A1* | 2/2015 | Takeda .................... H04J 11/00 370/329 |
| 2015/0117342 A1* | 4/2015 | Loehr ............... H04W 72/1284 370/329 |
| 2016/0134409 A1* | 5/2016 | Kang .................... H04L 1/0026 370/329 |
| 2016/0134458 A1 | 5/2016 | Xia et al. |
| 2016/0197687 A1* | 7/2016 | Song ........................ H04L 5/00 370/252 |
| 2016/0218832 A1* | 7/2016 | Dabeer ................ H04L 1/1621 |
| 2017/0180101 A1* | 6/2017 | Golitschek Edler von Elbwart ................ H04L 1/0026 |
| 2017/0359745 A1* | 12/2017 | Lee .......................... H04L 1/00 |
| 2019/0014601 A1* | 1/2019 | Kim ...................... H04W 16/18 |

FOREIGN PATENT DOCUMENTS

| | | |
|---|---|---|
| CN | 104158620 A | 11/2014 |
| EP | 2566268 A1 | 3/2013 |
| EP | 2930992 A1 | 10/2015 |
| WO | 2013017154 A1 | 2/2013 |
| WO | 2014088371 A1 | 6/2014 |

* cited by examiner

CONTROL INFORMATION TRANSMISSION METHOD, BASE STATION, AND USER EQUIPMENT

CROSS-REFERENCE TO RELATED APPLICATIONS

This application is a continuation of International Application No. PCT/CN2015/074294, filed on Mar. 16, 2015, the disclosure of which is hereby incorporated by reference in its entirety.

TECHNICAL FIELD

Embodiments of the present invention relate to communications systems, and in particular, to a control information transmission method, a base station, and user equipment.

BACKGROUND

In current communications systems, control information of data is transmitted by a physical downlink control channel (PDCCH) or an enhanced physical downlink control channel (E-PDCCH). The control information includes information such as resource allocation, a modulation format, and an encoding format that facilitates data scheduling, and 16 cyclic redundancy check (CRC) bits. Therefore, there are usually tens of information bits in the control information in total. However, the PDCCH is only allowed to occupy the first three symbols of a subframe. Therefore, the current PDCCH can accommodate only a limited quantity of control information.

As terminals increase and various data services appear, data traffic is to increase abruptly. Therefore, a future communications system or a fifth-generation mobile communications system needs to be capable of supporting connection of massive devices and reception/transmission of large amounts of data, and a large quantity of control information is required to control the reception/transmission of data. However, current control channels can accommodate only a limited quantity of control information, and consequently cannot satisfy the reception/transmission of large quantities of control information caused by connection of large quantities of devices and reception/transmission of large amounts of data.

SUMMARY

Embodiments of the present invention provide a control information transmission method, a base station, and user equipment that can improve control channel utilization efficiency, so as to satisfy reception/transmission of large quantities of control information caused by connection of large quantities of devices and reception/transmission of large amounts of data.

According to a first aspect, a control information sending method is provided. The method includes sending, by a base station, first control information to first user equipment. The method also includes transceiving, by the base station, first data to/from the first user equipment according to the first control information. The method also includes sending, by the base station, first trigger information to the first user equipment, where the first trigger information is used to indicate that the base station transceives second data to/from the first user equipment according to partial information or all information of the first control information.

In a first possible implementation, the sending, by the base station, first trigger information to the first user equipment includes: sending, by the base station, a first control message to the first user equipment, where the first control message includes the first trigger information.

With reference to the first possible implementation, in a second possible implementation, the first control message further includes at least one piece of second trigger information, and the at least one piece of second trigger information and the first trigger information are trigger information specific to different user equipments.

With reference to the second possible implementation, in a third possible implementation, the first trigger information or each of the at least one piece of second trigger information occupies X bits; and a quantity N of the first trigger information or the at least one piece of second trigger information that can be included in the first control message makes the following equation true:

$$N = \left\lfloor \frac{L}{X} \right\rfloor,$$

where L is a quantity of bits occupied by information bits of the first control message.

With reference to the first to the third possible implementations, in a fourth possible implementation, the first control message further includes at least one piece of second control information; and the base station transceives third data to/from second user equipment according to the second control information.

With reference to the first aspect, or the first to the fourth possible implementations, in a fifth possible implementation, at the same time of sending, by the base station, first trigger information to the first user equipment, the method further includes: sending, by the base station, at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information to the first user equipment, where the new data indication information is used to indicate whether the second data is initially transmitted data, the power control command of the physical uplink control channel is used to indicate power of the physical uplink control channel, and the data channel indication information is used to indicate that the first trigger information is used for the physical uplink data channel or a physical downlink data channel.

With reference to the fifth possible implementation, in a sixth possible implementation, the first trigger information is used to indicate that the base station transceives the second data to/from the first user equipment according to partial information of the first control information, and the method further includes: transceiving, by the base station, the second data to/from the first user equipment according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is included in the first trigger information; or transceiving, by the base station, the second data to/from the first user equipment according to partial information of the first control information and predefined control information of the first control information except the partial information.

With reference to the first aspect, or the first to the sixth possible implementations, in a seventh possible implementation, after the sending, by the base station, first trigger information to the first user equipment, the method further includes: sending, by the base station, third control information to the first user equipment, where the third control information is used by the base station to transceive fourth data to/from the first user equipment according to the third control information.

With reference to the first aspect, or the first to the seventh possible implementations, in an eighth possible implementation, the first control information is the last piece of control information that is associated with the first trigger information and that is sent by the base station to the first user equipment before the base station sends the first trigger information to the first user equipment.

With reference to the first aspect, or the first to the eighth possible implementations, in a ninth possible implementation, after the transceiving, by the base station, first data to/from the first user equipment according to the first control information, and before the sending, by the base station, first trigger information to the first user equipment, the method further includes: receiving, by the base station, an acknowledgement message from the first user equipment, where the acknowledgement message is used to notify the base station that the first user equipment has successfully received the first data according to the first control information.

According to a second aspect, a base station is provided. The base station includes a sending unit, configured to send first control information to first user equipment. The base station also includes a transceiver unit, configured to transceive first data to/from the first user equipment according to the first control information. The sending unit is further configured to send first trigger information to the first user equipment, where the first trigger information is used to indicate that the transceiver unit transceives second data to/from the first user equipment according to partial information or all information of the first control information.

In a first possible implementation, that the sending unit is further configured to send the first trigger information to the first user equipment includes: sending, by the sending unit, a first control message to the first user equipment, where the first control message includes the first trigger information.

With reference to the first possible implementation, in a second possible implementation, the first control message further includes at least one piece of second trigger information, and the at least one piece of second trigger information and the first trigger information are trigger information specific to different user equipments.

With reference to the second possible implementation, in a third possible implementation, the first trigger information or each of the at least one piece of second trigger information occupies X bits; and a quantity N of the first trigger information or the at least one piece of second trigger information that can be included in the first control message makes the following equation true:

$$N = \left\lfloor \frac{L}{X} \right\rfloor,$$

where L is a quantity of bits occupied by information bits of the first control message.

With reference to the first to the third possible implementations, in a fourth possible implementation, the first control message further includes at least one piece of second control information; and the transceiver unit is further configured to transceive third data to/from second user equipment according to the second control information.

With reference to the second aspect, or the first to the fourth possible implementations, in a fifth possible implementation, at the same time when the sending unit sends the first trigger information to the first user equipment, the sending unit is further configured to send at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information to the first user equipment, where the new data indication information is used to indicate whether the second data is initially transmitted data, the power control command of the physical uplink control channel is used to indicate power of the physical uplink control channel, and the data channel indication information is used to indicate that the first trigger information is used for the physical uplink data channel or a physical downlink data channel.

With reference to the fifth possible implementation, in a sixth possible implementation, the first trigger information is used to indicate that the transceiver unit transceives the second data to/from the first user equipment according to partial information of the first control information, and the base station further includes: transceiving, by the transceiver unit, the second data to/from the first user equipment according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is included in the first trigger information; or transceiving, by the transceiver unit, the second data to/from the first user equipment according to partial information of the first control information and predefined control information of the first control information except the partial information.

With reference to the second aspect, or the first to the sixth possible implementations, in a seventh possible implementation, after the sending unit sends the first trigger information to the first user equipment, the sending unit is further configured to: send third control information to the first user equipment, where the third control information is used by the transceiver unit to transceive fourth data to/from the first user equipment according to the third control information.

With reference to the second aspect, or the first to the seventh possible implementations, in an eighth possible implementation, the first control information is the last piece of control information that is associated with the first trigger information and that is sent by the sending unit to the first user equipment before the sending unit sends the first trigger information to the first user equipment.

With reference to the second aspect, or the first to the eighth possible implementations, in a ninth possible implementation, the base station further includes: a receiving unit, configured to: after the transceiver unit transceives the first data to/from the first user equipment according to the first control information, and before the sending unit sends the first trigger information to the first user equipment, receive an acknowledgement message from the first user equipment, where the acknowledgement message is used to notify the base station that the first user equipment has successfully received the first data according to the first control information.

According to a third aspect, a base station is provided. The base station includes a sender, configured to send first control information to first user equipment. The base station also includes a transceiver, configured to transceive first data to/from the first user equipment according to the first control information, where the sender is further configured to send first trigger information to the first user equipment, where the first trigger information is used to indicate that the transceiver transceives second data to/from the first user equipment according to partial information or all information of the first control information.

In a first possible implementation, that the sender is further configured to send the first trigger information to the first user equipment includes: sending, by the sender, a first control message to the first user equipment, where the first control message includes the first trigger information.

With reference to the first possible implementation, in a second possible implementation, the first control message further includes at least one piece of second trigger information, and the at least one piece of second trigger information and the first trigger information are trigger information specific to different user equipments.

With reference to the second possible implementation, in a third possible implementation, the first trigger information or each of the at least one piece of second trigger information occupies X bits; and a quantity N of the first trigger information or the at least one piece of second trigger information that can be included in the first control message makes the following equation true:

$$N = \left\lfloor \frac{L}{X} \right\rfloor,$$

where L is a quantity of bits occupied by information bits of the first control message.

With reference to the first to the third possible implementations, in a fourth possible implementation, the first control message further includes at least one piece of second control information; and the transceiver is further configured to transceive third data to/from second user equipment according to the second control information.

With reference to the third aspect, or the first to the fourth possible implementations, in a fifth possible implementation, at the same time when the sending unit sends the first trigger information to the first user equipment, the sending unit is further configured to send at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information to the first user equipment, where the new data indication information is used to indicate whether the second data is initially transmitted data, the power control command of the physical uplink control channel is used to indicate power of the physical uplink control channel, and the data channel indication information is used to indicate that the first trigger information is used for the physical uplink data channel or a physical downlink data channel.

With reference to the fifth possible implementation, in a sixth possible implementation, the first trigger information is used to indicate that the transceiver transceives the second data to/from the first user equipment according to partial information of the first control information, and the base station further includes: transceiving, by the transceiver, the second data to/from the first user equipment according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is included in the first trigger information; or transceiving, by the transceiver, the second data to/from the first user equipment according to partial information of the first control information and predefined control information of the first control information except the partial information.

With reference to the third aspect, or the first to the sixth possible implementations, in a seventh possible implementation, after the sender sends the first trigger information to the first user equipment, the sending unit is further configured to: send third control information to the first user equipment, where the third control information is used by the transceiver to transceive fourth data to/from the first user equipment according to the third control information.

With reference to the third aspect, or the first to the seventh possible implementations, in an eighth possible implementation, the first control information is the last piece of control information that is associated with the first trigger information and that is sent by the sender to the first user equipment before the sender sends the first trigger information to the first user equipment.

With reference to the third aspect, or the first to the eighth possible implementations, in a ninth possible implementation, the base station further includes: a receiver, configured to: after the transceiver unit transceives the first data to/from the first user equipment according to the first control information, and before the sending unit sends the first trigger information to the first user equipment, receive an acknowledgement message from the first user equipment, where the acknowledgement message is used to notify the base station that the first user equipment has successfully received the first data according to the first control information.

According to a fourth aspect, a control information receiving method is provided. The method includes receiving, by first user equipment, first control information from a base station; transceiving, by the first user equipment, first data to/from the base station according to the first control information. The method also includes receiving, by the first user equipment, first trigger information from the base station, where the first trigger information is used to instruct the first user equipment to transceive second data to/from the base station according to partial information or all information of the first control information.

In a first possible implementation, the receiving, by the first user equipment, first trigger information from the base station includes: receiving, by the first user equipment, a first control message from the base station, where the first control message includes the first trigger information.

With reference to the first possible implementation, in a second possible implementation, the first control message further includes at least one piece of second trigger information, and the at least one piece of second trigger information and the first trigger information are trigger information specific to different user equipments.

With reference to the second possible implementation, in a third possible implementation, the first trigger information or each of the at least one piece of second trigger information occupies X bits; and a quantity N of the first trigger information or the at least one piece of second trigger information that can be included in the first control message makes the following equation true:

$$N = \left\lfloor \frac{L}{X} \right\rfloor,$$

where L is a quantity of bits occupied by information bits of the first control message.

With reference to the first to the third possible implementations, in a fourth possible implementation, the first control message further includes at least one piece of second control information; and second user equipment transceives third data to/from the base station according to the second control information.

With reference to the fourth aspect, or the first to the fourth possible implementations, in a fifth possible implementation, at the same time of receiving, by the first user equipment, first trigger information from the base station, the method further includes: receiving, by the first user equipment from the base station, at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information, where the new data indication information is used to indicate whether the second data is initially transmitted data, the power control command of the physical uplink control channel is used to indicate power of the physical uplink control channel, and the data channel indication information is used to indicate that the first trigger information is used for the physical uplink data channel or a physical downlink data channel.

With reference to the fifth possible implementation, in a sixth possible implementation, the first trigger information is used to instruct the first user equipment to transceive the second data to/from the base station according to partial information of the first control information, and the method further includes: transceiving, by the first user equipment, the second data to/from the base station according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is included in the first trigger information; or transceiving, by the first user equipment, the second data to/from the base station according to partial information of the first control information and predefined control information of the first control information except the partial information.

With reference to the fourth aspect, or the first to the sixth possible implementations, in a seventh possible implementation, after the receiving, by the first user equipment, first trigger information from the base station, the method further includes: receiving, by the first user equipment, third control information from the base station, where the third control information is used by the first user equipment to transceive fourth data to/from the base station according to the third control information.

With reference to the fourth aspect, or the first to the seventh possible implementations, in an eighth possible implementation, the first control information is the last piece of control information that is associated with the first trigger information and that is received by the first user equipment from the base station before the first user equipment receives the first trigger information from the base station.

With reference to the fourth aspect, or the first to the eighth possible implementations, in a ninth possible implementation, after the transceiving, by the first user equipment, first data to/from the base station according to the first control information, and before the receiving, by the first user equipment, first trigger information from the base station, the method further includes: sending, by the first user equipment, an acknowledgement message to the base station, where the acknowledgement message is used to notify the base station that the first user equipment has successfully received the first data according to the first control information.

According to a fifth aspect, user equipment is provided. The user equipment includes a receiving unit, configured to receive first control information from a base station. The user equipment also includes a transceiver unit, configured to transceive first data to/from the base station according to the first control information. The receiving unit is further configured to receive first trigger information from the base station, where the first trigger information is used to instruct the transceiver unit to transceive second data to/from the base station according to partial information or all information of the first control information.

In a first possible implementation, that the receiving unit is further configured to receive the first trigger information from the base station includes: receiving, by the receiving unit, a first control message from the base station, where the first control message includes the first trigger information.

With reference to the first possible implementation, in a second possible implementation, the first control message further includes at least one piece of second trigger information, and the at least one piece of second trigger information and the first trigger information are trigger information specific to different user equipments.

With reference to the second possible implementation, in a third possible implementation, the first trigger information or each of the at least one piece of second trigger information occupies X bits; and a quantity N of the first trigger information or the at least one piece of second trigger information that can be included in the first control message makes the following equation true:

$$N = \left\lfloor \frac{L}{X} \right\rfloor,$$

where L is a quantity of bits occupied by information bits of the first control message.

With reference to the first to the third possible implementations, in a fourth possible implementation, the first control message further includes at least one piece of second control information; and second user equipment transceives third data to/from the base station according to the second control information.

With reference to the fifth aspect, or the first to the fourth possible implementations, in a fifth possible implementation, at the same time when the receiving unit receives the first trigger information from the base station, the receiving unit is further configured to receive, from the base station, at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information, where the new data indication information is used to indicate whether the second data is initially transmitted data, the power control command of the physical uplink control channel is used to indicate power of the physical uplink control channel, and the data channel indication information is used to indicate that the first trigger information is used for the physical uplink data channel or a physical downlink data channel.

With reference to the fifth possible implementation, in a sixth possible implementation, the first trigger information is used to instruct the transceiver unit to transceive the second data to/from the base station according to partial information of the first control information, and the user equipment further includes: transceiving, by the transceiver unit, the second data to/from the base station according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is included in the first trigger information; or transceiving, by the transceiver unit, the second data to/from the base station according to partial information of the first control information and predefined control information of the first control information except the partial information.

With reference to the fifth aspect, or the first to the sixth possible implementations, in a seventh possible implementation, after the receiving unit receives the first trigger information from the base station, the receiving unit is further configured to: receive third control information from the base station, where the third control information is used by the transceiver unit to transceive fourth data to/from the base station according to the third control information.

With reference to the fifth aspect, or the first to the seventh possible implementations, in an eighth possible implementation, the first control information is the last piece of control information that is associated with the first trigger information and that is received by the receiving unit from the base station before the receiving unit receives the first trigger information from the base station.

With reference to the fifth aspect, or the first to the eighth possible implementations, in a ninth possible implementation, the user equipment further includes: a sending unit, configured to: after the transceiver unit transceives the first data to/from the base station according to the first control information, and before the receiving unit receives the first trigger information from the base station, send an acknowledgement message to the base station, where the acknowledgement message is used to notify the base station that the receiving unit has successfully received the first data according to the first control information.

According to a sixth aspect, user equipment is provided. The user equipment includes a receiver, configured to receive first control information from a base station. The user equipment also includes a transceiver, configured to transceive first data to/from the base station according to the first control information, where the receiver is further configured to receive first trigger information from the base station, where the first trigger information is used to indicate that the transceiver transceives second data to/from the base station according to partial information or all information of the first control information.

In a first possible implementation, that the receiver is further configured to receive the first trigger information from the base station includes: receiving, by the receiver, a first control message from the base station, where the first control message includes the first trigger information.

With reference to the first possible implementation, in a second possible implementation, the first control message further includes at least one piece of second trigger information, and the at least one piece of second trigger information and the first trigger information are trigger information specific to different user equipments.

With reference to the second possible implementation, in a third possible implementation, the first trigger information or each of the at least one piece of second trigger information occupies X bits; and a quantity N of the first trigger information or the at least one piece of second trigger information that can be included in the first control message makes the following equation true:

$$N = \left\lfloor \frac{L}{X} \right\rfloor,$$

where L is a quantity of bits occupied by information bits of the first control message.

With reference to the first to the third possible implementations, in a fourth possible implementation, the first control message further includes at least one piece of second control information; and second user equipment transceives third data to/from the base station according to the second control information.

With reference to the sixth aspect, or the first to the fourth possible implementations, in a fifth possible implementation, at the same time when the receiving unit receives the first trigger information from the base station, the receiving unit is further configured to receive, from the base station, at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information, where the new data indication information is used to indicate whether the second data is initially transmitted data, the power control command of the physical uplink control channel is used to indicate power of the physical uplink control channel, and the data channel indication information is used to indicate that the first trigger information is used for the physical uplink data channel or a physical downlink data channel.

With reference to the fifth possible implementation, in a sixth possible implementation, the first trigger information is used to indicate that the transceiver transceives the second data to/from the base station according to partial information of the first control information, and the user equipment further includes: transceiving, by the transceiver, the second data to/from the base station according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is included in the first trigger information; or transceiving, by the transceiver, the second data to/from the base station according to partial information of the first control information and predefined control information of the first control information except the partial information.

With reference to the sixth aspect, or the first to the sixth possible implementations, in a seventh possible implementation, after the receiver receives the first trigger information from the base station, the receiving unit is further configured to: receive third control information from the base station, where the third control information is used by the transceiver to transceive fourth data to/from the base station according to the third control information.

With reference to the sixth aspect, or the first to the seventh possible implementations, in an eighth possible implementation, the first control information is the last piece of control information that is associated with the first trigger information and that is received by the receiver from the base station before the receiver receives the first trigger information from the base station.

With reference to the sixth aspect, or the first to the eighth possible implementations, in a ninth possible implementation, the user equipment further includes: a sending unit, configured to: after the transceiver unit transceives the first data to/from the base station according to the first control information, and before the receiving unit receives the first trigger information from the base station, send an acknowledgement message to the base station, where the acknowledgement message is used to notify the base station that the receiving unit has successfully received the first data according to the first control information.

According to a seventh aspect, a control information sending method is provided. The method includes configuring, by a base station, multiple pieces of control information, where the multiple pieces of control information are configured by the base station separately for different user equipments. The method also includes sending, by the base station, trigger information to first user equipment, where the trigger information is used by the base station to read, according to the trigger information, one of the multiple pieces of control information that is configured for the first user equipment, where the one of the multiple pieces of control information that is configured for the first user equipment is used to indicate a location of data on a time frequency resource. The method also includes transceiving, by the base station, the data to/from the first user equipment according to the one of the multiple pieces of control information that is configured for the first user equipment.

In a first possible implementation, the trigger information is information of 2 bits.

According to an eighth aspect, a base station is provided. The base station also includes a processing unit, configured to configure multiple pieces of control information, where the multiple pieces of control information are configured by the processing unit separately for different user equipments. The base station also includes a sending unit, configured to send trigger information to first user equipment. The trigger information is used by the processing unit to read, according to the trigger information, one of the multiple pieces of control information that is configured for the first user equipment, where the one of the multiple pieces of control information that is configured for the first user equipment is used to indicate a location of data on a time frequency resource. The user equipment also includes a transceiver unit, configured to transceive the data to/from the first user equipment according to the one of the multiple pieces of control information that is configured for the first user equipment.

In a first possible implementation, the trigger information is information of 2 bits.

According to a ninth aspect, a base station is provided. The base station includes a processor, configured to configure multiple pieces of control information, where the multiple pieces of control information are configured by the processing unit separately for different user equipments. The base station also includes a sender, configured to send trigger information to first user equipment, where the trigger information is used by the processing unit to read, according to the trigger information, one of the multiple pieces of control information that is configured for the first user equipment, where the one of the multiple pieces of control information that is configured for the first user equipment is used to indicate a location of data on a time frequency resource. The base station also includes a transceiver, configured to transceive the data to/from the first user equipment according to the one of the multiple pieces of control information that is configured for the first user equipment.

In a first possible implementation, the trigger information is information of 2 bits.

According to a tenth aspect, a control information receiving method is provided. The method includes receiving, by user equipment, trigger information from a base station, where the trigger information is used by the user equipment to read first control information according to the trigger information. The first control information is one of multiple pieces of control information that are configured by the base station separately for different user equipments, and is configured for the user equipment, and the first control information is used to indicate a location of data on a time frequency resource. The method also includes transceiving, by the user equipment, the data to/from the base station according to the first control information.

In a first possible implementation, the trigger information is information of 2 bits.

According to an eleventh aspect, user equipment is provided. The user equipment includes a receiving unit, configured to receive trigger information from a base station. The user equipment also includes a processing unit, configured to read first control information according to the trigger information, where the first control information is one of multiple pieces of control information that are configured by the base station separately for different user equipments, and is configured for the user equipment, and the first control information is used to indicate a location of data on a time frequency resource. The user equipment also includes a transceiver unit, configured to transceive the data to/from the base station according to the first control information.

In a first possible implementation, the trigger information is information of 2 bits.

According to a twelfth aspect, user equipment is provided. The user equipment includes a receiver, configured to receive trigger information from a base station. The user equipment also includes a processor, configured to read first control information according to the trigger information, where the first control information is one of multiple pieces of control information that are configured by the base station separately for different user equipments, and is configured for the user equipment, and the first control information is used to indicate a location of data on a time frequency resource. The user equipment also includes a transceiver, configured to transceive the data to/from the base station according to the first control information.

In a first possible implementation, the trigger information is information of 2 bits.

According to the foregoing solutions, a base station sends first trigger information to first user equipment, where the first trigger information is used to indicate that the base station transceives second data to/from the first user equipment according to partial information or all information of first control information. Therefore, the base station sends the second data to the first user equipment according to partial information or all information of the first control information. That is, when sending new data, the base station uses the previous control information, and the first trigger information occupies fewer resources than the control information, thereby improving control channel utilization efficiency, so as to satisfy reception/transmission of large quantities of control information caused by connection of large quantities of devices and reception/transmission of large amounts of data.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
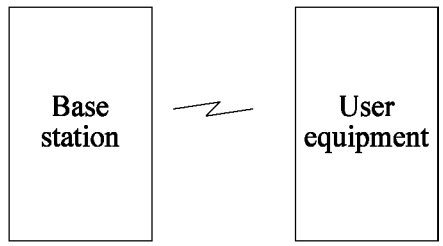
FIG. 1 is a schematic architectural diagram of a system according to an embodiment of the present invention.

FIG. 1 is a schematic architectural diagram of a system according to an embodiment of the present invention.

A base station provided in this embodiment of the present invention may be a NodeB (NB) in UMTS, an evolved NodeB (eNodeB, eNB) in LTE, or a base station or controller in a fifth-generation mobile communications system.

User equipment (UE) provided in this embodiment of the present invention may be, but is not limited to, a mobile station (MS), a mobile terminal, a mobile telephone, a handset, portable equipment, or the like.

In this embodiment of the present invention, a base station sends control information to user equipment, and the base station sends or receives data according to the control information. Specifically, the base station sends control information to the user equipment, the base station sends data to the user equipment according to the control information, and the user equipment receives the control information, and receives the data according to the control information; or, the base station sends control information to the user equipment, the user equipment sends data to the base station according to the control information, and the base station receives the data according to the control information.

This embodiment of the present invention is based on the foregoing system architecture. It should be noted that, when no conflict occurs, embodiments and features in the embodiments may be combined with each other.

Figure 2:
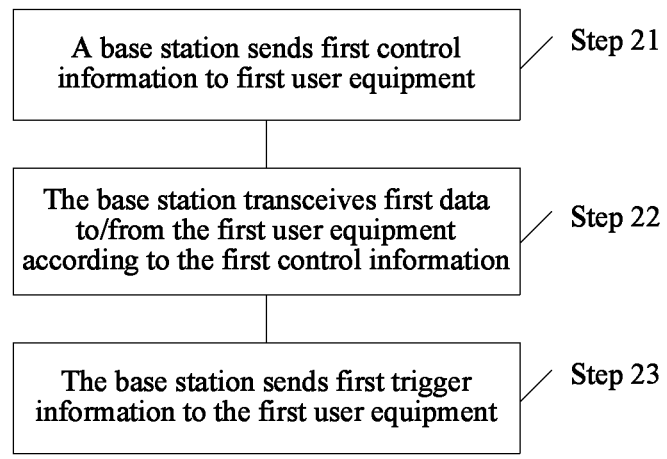
FIG. 2 shows a control information sending method according to an embodiment of the present invention.

FIG. 2 shows a control information sending method according to an embodiment of the present invention, and the method includes the following steps.

Step 21. A base station sends first control information to first user equipment. Optionally, the first control information is existing control information, and includes at least one of resource allocation information, modulation and coding indication information, a hybrid automatic repeat request process number, new data indication information, a power control command of a physical uplink control channel, a cyclic shift sequence of a demodulation pilot, a power control command of a physical uplink data channel, a channel quality indicator, or data channel indication information. Optionally, the first control information is downlink control information (DCI) or uplink control information (UCI).

Step 22. The base station transceives first data to/from the first user equipment according to the first control information. Optionally, during downlink data transmission, the base station sends the first data to the first user equipment according to the first control information, that is, DCI; during uplink data transmission, the base station receives the first data from the first user equipment according to the first control information, that is, UCI.

Step 23. The base station sends first trigger information to the first user equipment. The first trigger information is used to indicate that the base station transceives second data to/from the first user equipment according to partial information or all information of the first control information. Optionally, during downlink data transmission, the first trigger information is used to indicate that the base station sends the second data to the first user equipment according to partial information or all information of the first control information; during uplink data transmission, the first trigger information is used to indicate that the base station receives the second data from the first user equipment according to partial information or all information of the first control information. Optionally, the first trigger information is used to indicate that the base station transceives the second data to/from the first user equipment according to partial information or all information of the first control information. That is, the first trigger information is used to indicate that the base station transceives the second data to/from the first user equipment according to partial information or all information of the first control information, and which specific information of the first control information the partial information or all information is. Optionally, the second data and the first data are different data. For example, the first data and the second data are both source data that has not been encoded, and the second data and the first data are different source data that has not been encoded.

According to the foregoing solution, the base station sends the first trigger information to the first user equipment, where the first trigger information is used to indicate that the base station transceives the second data to/from the first user equipment according to partial information or all information of the first control information. Therefore, the base station transceives the second data to/from the first user equipment according to partial information or all information of the first control information. That is, when transceiving new data to/from the first user equipment, the base station uses the previous control information, and the first trigger information occupies fewer resources than the control information, thereby improving control channel utilization efficiency, so as to satisfy reception/transmission of large quantities of control information caused by connection of large quantities of devices and reception/transmission of large amounts of data.

In an optional embodiment, the sending, by the base station, first trigger information to the first user equipment includes: sending, by the base station, a first control message to the first user equipment, where the first control message includes the first trigger information. Optionally, the first control message is sent on a downlink control channel by the base station to the first user equipment, and the first control message may be of a new control channel format. For example, a control channel of a user is used to carry trigger information of another user. The base station configures M UEs as a group. In addition, the base station notifies UE of cell radio network temporary identifiers (C-RNTI) of other UEs in the group. For another example, a new control channel format may be defined for the first control message, so that not only scheduling information of an expected user but also trigger information of another user are carried. Cyclic redundancy check (CRC) of this control channel is scrambled by using a C-RNIT of the expected user. For example, when M=3, there are three users in a group. The base station notifies a C-RNTI of each UE to users in the group. The base station sends scheduling of one downlink PDSCH to UE2 by using a PDCCH, and CRC of this PDCCH is scrambled by using a C-RNTI of UE2. Moreover, this control channel not only carries scheduling information of UE2 such as scheduling information in format 1A, but also carries trigger information of UE1 and UE3. For another example, a new control signaling format may be defined for the first control message, and a load of this control signaling is L, where L is a bit quantity of information bits of this control channel before CRC bits are added. For example, the load of this control signaling is the same as that of format 0, and X bits trigger information is allocated to each user. In this control channel, trigger information may be sent to $$N = \left\lfloor \frac{L}{X} \right\rfloor$$

users. In this way, a quantity of control channels is reduced.

In an optional embodiment, the first control message further includes at least one piece of second trigger information, and the at least one piece of second trigger information and the first trigger information are trigger information specific to different user equipments. Specifically, the second trigger information is trigger information that is sent by the base station to user equipment different from the first user equipment, and there may be multiple user equipments different from the first user equipment. In this case, the at least one piece of second trigger information is multiple pieces of second trigger information corresponding to the user equipments different from the first user equipment. It may be understood that, the second trigger information is only a name for differing from the first trigger information, and the multiple pieces of second trigger information corresponding to the multiple user equipments different from the first user equipment may be different.

In an optional embodiment, the first trigger information or each of the at least one piece of second trigger information occupies X bits; and a quantity N of the first trigger information or the at least one piece of second trigger information that can be included in the first control message makes the following equation true:

$$N = \left\lfloor \frac{L}{X} \right\rfloor.$$

L is a quantity of bits occupied by information bits of the first control message. For example, Table 1 shows a case in which the first trigger information or the at least one piece of second trigger information occupies $X_{DL}$ bits during downlink data transmission.

TABLE 1

| | $x_{DL} = 7$ | $x_{DL} = 5$ | $x_{DL} = 2$ | $x_{DL} = 1$ |
|---|---|---|---|---|
| Trigger information | 1 bit, to indicate whether a PDSCH is transmitted or indicate that the data indication information is partial information or all information of the first control channel | 1 bit, to indicate whether a PDSCH is transmitted or indicate that the data indication information is partial information or all information of the first control channel | 1 bit, to indicate whether a PDSCH is transmitted or indicate that the data indication information is partial information or all information of the first control channel | 1 bit, to indicate whether a PDSCH is transmitted or indicate that the data indication information is partial information or all information of the first control channel |

TABLE 1-continued

|  | $x_{DL} = 7$ | $x_{DL} = 5$ | $x_{DL} = 2$ | $x_{DL} = 1$ |
|---|---|---|---|---|
| Hybrid automatic repeat request process number | 3 bits | 3 bits | None | None |
| New data indication information | 1 bit | 1 bit | 1 bit | None |
| Power control command of a physical uplink control channel | 2 bits | None | None | None |

Alternatively, for example, Table 2 shows a case in which the first trigger information or the at least one piece of second trigger information occupies $X_{UL}$ bits during uplink data transmission.

TABLE 2

|  | $x_{UL} = 8$ | $x_{UL} = 7$ | $x_{UL} = 5$ | $x_{UL} = 4$ | $x_{UL} = 2$ | $x_{UL} = 1$ |
|---|---|---|---|---|---|---|
| Trigger indication information | 1 bit, to indicate whether a PUSCH is transmitted or indicate that the data indication information is partial information or all information of the first control channel | 1 bit, to indicate whether a PUSCH is transmitted or indicate that the data indication information is partial information or all information of the first control channel | 1 bit, to indicate whether a PUSCH is transmitted or indicate that the data indication information is partial information or all information of the first control channel | 1 bit, to indicate whether a PUSCH is transmitted or indicate that the data indication information is partial information or all information of the first control channel | 1 bit, to indicate whether a PUSCH is transmitted or indicate that the data indication information is partial information or all information of the first control channel | 1 bit, to indicate whether a PUSCH is transmitted or indicate that the data indication information is partial information or all information of the first control channel |
| Cyclic shift sequence of a demodulation pilot | 3 bits | 3 bits | None | None | None | None |
| New data indication information | 1 bit | 1 bit | 1 bit | 1 bit | 1 bit | None |
| Power control command of a physical uplink data channel | 2 bits | 2 bits | 2 bits | 2 bits | None | None |
| Channel quality indicator | 1 bit | None | 1 bit | None | None | None |

In an optional embodiment, the first control message further includes at least one piece of second control information, and the base station transceives third data to/from second user equipment according to the second control information. Optionally, the second control information is existing control information, and includes at least one of the resource allocation information, the modulation and coding indication information, the hybrid automatic repeat request process number, the new data indication information, the power control command of the physical uplink control channel, the cyclic shift sequence of the demodulation pilot, the power control command of the physical uplink data channel, the channel quality indicator, or the data channel indication information. Optionally, the second control information is DCI or UCI, and the second control information and the first control information are different control information.

In an optional embodiment, at the same time of sending, by the base station, first trigger information to the first user equipment, the method further includes: sending, by the base station, at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information to the first user equipment. The new data indication information is used to indicate whether the second data is initially transmitted data, the power control command of the physical uplink control channel is used to indicate power of the physical uplink control channel, and the data channel indication information is used to indicate that the trigger indication information is used for the physical uplink data channel or a physical downlink data channel. Optionally, at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information may be sent by the base station to the first user equipment along with the first trigger information by using a same message.

In an optional embodiment, the first trigger information is used to indicate that the base station transceives the second data to/from the first user equipment according to partial information of the first control information, and the method of the embodiment in FIG. 2 further includes: transceiving, by the base station, the second data to/from the first user equipment according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is included in the first trigger information. For example, for $X_{DL}=7$ in Table 1, the first trigger information indicates that the base station sends the second data to the first user equipment according to partial information of the first control information. The partial information of the first control information is resource allocation information and modulation and coding indication information. The resource allocation information is used to indicate a time frequency resource occupied by the base station to send the first data. Therefore, the base station sends the second data to the first user equipment according to the resource allocation information, the modulation and coding indication information, the hybrid automatic repeat request process number, the new data indication information, and the power control command of the physical uplink control channel. In this case, the resource allocation information and the modulation and coding indication information are included in the first control information. Information such as the hybrid automatic repeat request process number, the new data indication information, and the power control command of the physical uplink control channel is carried in the first trigger information. The first trigger information is not only used to indicate that the partial information is the resource allocation information and the modulation and coding indication information, but also carries the hybrid automatic repeat request process number, the new data indication information, and the power control command of the physical uplink control channel. For another example, for $X_{UL}=8$ in Table 2, the first trigger information indicates that the base station receives the second data from the first user equipment according to partial information of the first control information. The partial information of the first control information is resource allocation information and modulation and coding indication information. The resource allocation information is used to indicate a time frequency resource occupied by the base station to receive the first data. Therefore, the base station receives the second data from the first user equipment according to the resource allocation information, the modulation and coding indication information, the cyclic shift sequence of the demodulation pilot, the new data indication information, the power control command of the physical uplink data channel, and the channel quality indicator. In this case, the resource allocation information and the modulation and coding indication information are included in the first control information. The cyclic shift sequence of the demodulation pilot, the new data indication information, the power control command of the physical uplink data channel, and the channel quality indicator are carried in the first trigger information. The first trigger information is not only used to indicate that the partial information is the resource allocation information and the modulation and coding indication information, but also carries the cyclic shift sequence of the demodulation pilot, the new data indication information, the power control command of the physical uplink data channel, and the channel quality indicator.

In an optional embodiment, the first trigger information is used to indicate that the base station transceives the second data to/from the first user equipment according to all information of the first control information. Therefore, the base station transceives the second data to/from the first user equipment according to all information of the first control channel. For example, for $X_{DL}=1$ in Table 1, the first trigger information is used to indicate that the base station sends the second data to the first user equipment according to all information of the first control information. The all information of the first control information is specifically the resource allocation information, the modulation and coding indication information, the hybrid automatic repeat request process number, the new data indication information, and the power control command of the physical uplink control channel. The resource allocation information is used to indicate a time frequency resource occupied by the base station to send the first data. Therefore, the base station sends the second data to the first user equipment according to the resource allocation information, the modulation and coding indication information, the hybrid automatic repeat request process number, the new data indication information, and the power control command of the physical uplink control channel. In this case, the resource allocation information, the modulation and coding indication information, the hybrid automatic repeat request process number, the new data indication information, and the power control command of the physical uplink control channel are all included in the first control channel. For another example, for $X_{UL}=1$ in Table 2, the first trigger information is used to indicate that the base station receives the second data from the first user equipment according to all information of the first control information. The all information of the first control information is specifically the resource allocation information, the modulation and coding indication information, the hybrid automatic repeat request process number, the new data indication information, and the power control command of the physical uplink control channel. The resource allocation information is used to indicate a time frequency resource occupied by the base station to send the first data. Therefore, the base station receives the second data from the first user equipment according to the resource allocation information, the modulation and coding indication information, the hybrid automatic repeat request process number, the new data indication information, and the power control command of the physical uplink control channel. In this case, the resource allocation information, the modulation and coding indication information, the hybrid automatic repeat request process number, the new data indication information, and the power control command of the physical uplink control channel are all included in the first control channel.

In an optional embodiment, the first trigger information is used to indicate that the base station transceives the second data to/from the first user equipment according to partial information of the first control information, and the method of the embodiment in FIG. 2 further includes: transceiving, by the base station, the second data to/from the first user equipment according to partial information of the first control information and predefined control information of the first control information except the partial information. For example, for $X_{DL}=7$ in Table 1, the first trigger information is used to at least indicate that data indication information is the partial information of the first control channel and is specifically the resource allocation information and the modulation and coding indication information. The resource allocation information is used to indicate a time frequency resource occupied by the base station to send the first data. Therefore, the base station sends the second data to the first user equipment according to the resource allocation information, the modulation and coding indication information, the predefined hybrid automatic repeat request process number, the predefined new data indication information, and the predefined power control command of the physical uplink control channel. Information such as the hybrid automatic repeat request process number, the new data indication information, and the power control command of the physical uplink control channel is predefined. For another example, for $X_{UL}=7$ in Table 2, the first trigger information is used to at least indicate that data indication information is the partial information of the first control channel and is specifically the resource allocation information and the modulation and coding indication information. The resource allocation information is used to indicate a time frequency resource occupied by the base station to send the first data. Therefore, the base station receives the second data from the first user equipment according to the resource allocation information, the modulation and coding indication information, the predefined hybrid automatic repeat request process number, the predefined new data indication information, and the predefined power control command of the physical uplink control channel. Information such as the hybrid automatic repeat request process number, the new data indication information, and the power control command of the physical uplink control channel is predefined.

In an optional embodiment, the method of the embodiment in FIG. 2 further includes: after the base station sends the first trigger information to the first user equipment, sending, by the base station, third control information to the first user equipment, where the third control information is used by the base station to transceive fourth data to/from the first user equipment according to the third control information. Optionally, for downlink data transmission, the base station sends the fourth data to the first user equipment according to the third control information; for uplink data transmission, the base station receives the fourth data from the first user equipment according to the third control information. Optionally, the third control information is existing control information, and includes at least one of the resource allocation information, the modulation and coding indication information, the hybrid automatic repeat request process number, the new data indication information, the power control command of the physical uplink control channel, the cyclic shift sequence of the demodulation pilot, the power control command of the physical uplink data channel, the channel quality indicator, or the data channel indication information.

In an optional embodiment, the first control information is the last piece of control information that is associated with the first trigger information and that is sent by the base station to the first user equipment before the base station sends the first trigger information to the first user equipment.

In an optional embodiment, after the base station transceives the first data to/from the first user equipment according to the first control information, and before the base station sends the first trigger information to the first user equipment, the base station receives an acknowledgement message from the first user equipment, where the acknowledgement message is used to notify the base station that the first user equipment has successfully received the first data according to the first control information. For example, for downlink data transmission, after the base station sends the first data to the first user equipment according to the first control information, and before the base station sends the first trigger information to the first user equipment, the base station receives an acknowledgement message from the first user equipment, where the acknowledgement message is used by the first user equipment to notify the base station that the first user equipment has successfully received the first data according to the first control information. In the case of downlink data transmission, the base station sends the first data to the first user equipment according to the first control information. If the first user equipment has successfully received the first data, the first user equipment sends an acknowledgement message to the base station, and after receiving this acknowledgement message, the base station may determine that the first control information is valid control information. If the first user equipment does not send the acknowledgement message to the base station after the first user equipment receives the first data, the base station cannot determine whether the first control information is valid. Therefore, when subsequently sending the second data, the base station may use partial information or all information of the first control information as control information, that is, the base station sends the second data to the first user equipment according to partial information or all information of the first control information. In the case of uplink data transmission, the base station receives the first data from the first user equipment according to the first control information. In this case, the base station can determine whether the base station has successfully received the first data. Therefore, the first user equipment does not need to send an acknowledgement message to the base station.

Figure 3:
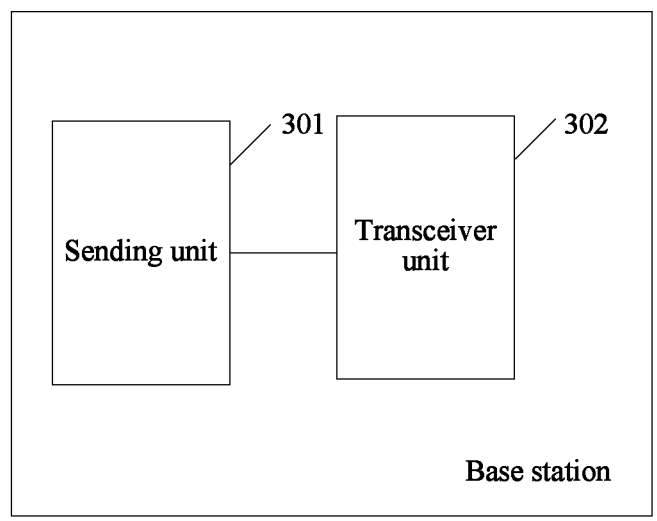
FIG. 3 shows a base station according to an embodiment of the present invention.

FIG. 3 shows a base station according to an embodiment of the present invention, configured to perform the method of the embodiment in FIG. 2, and the base station includes a sending unit 301 and a transceiver unit 302.

The sending unit 301 is configured to send first control information to first user equipment. Optionally, the first control information is existing control information, and includes at least one of resource allocation information, modulation and coding indication information, a hybrid automatic repeat request process number, new data indication information, a power control command of a physical uplink control channel, a cyclic shift sequence of a demodulation pilot, a power control command of a physical uplink data channel, a channel quality indicator, or data channel indication information. Optionally, the first control information is downlink control information (DCI) or uplink control information (UCI).

The transceiver unit 302 is configured to transceive first data to/from the first user equipment according to the first control information. Optionally, during downlink data transmission, the transceiver unit 302 sends the first data to the first user equipment according to the first control information, that is, DCI. During downlink data transmission, the transceiver unit 302 may be a sending unit, and this sending unit may be the sending unit 301, or may be another sending unit different from the sending unit 301. Optionally, during uplink data transmission, the transceiver unit 302 receives the first data from the first user equipment according to the first control information, that is, UCI. During uplink data transmission, the transceiver unit 302 may be a receiving unit 303.

The sending unit 301 is further configured to send first trigger information to the first user equipment. The first trigger information is used to indicate that the transceiver unit 302 transceives second data to/from the first user equipment according to partial information or all information of the first control information. Optionally, during downlink data transmission, the first trigger information is used to indicate that the transceiver unit 302 sends the second data to the first user equipment according to partial information or all information of the first control information; during uplink data transmission, the first trigger information is used to indicate that the transceiver unit 302 receives the second data from the first user equipment according to partial information or all information of the first control information. Optionally, the first trigger information is used to indicate that the transceiver unit 302 transceives the second data to/from the first user equipment according to partial information or all information of the first control information. That is, the first trigger information is used to indicate that the base station transceives the second data to/from the first user equipment according to partial information or all information of the first control information, and which specific information of the first control information the partial information or all information is. Optionally, the second data and the first data are different data. For example, both the first data and the second data are source data that has not been encoded, and the second data and the first data are different source data that has not been encoded.

According to the foregoing solution, the sending unit 301 sends the first trigger information to the first user equipment, where the first trigger information is used to indicate that the transceiver unit 302 transceives the second data to/from the first user equipment according to partial information or all information of the first control information. Therefore, the base station transceives the second data to/from the first user equipment according to partial information or all information of the first control information. That is, when transceiving new data to/from the first user equipment, the base station uses the previous control information, and the first trigger information occupies fewer resources than the control information, thereby improving control channel utilization efficiency, so as to satisfy reception/transmission of large quantities of control information caused by connection of large quantities of devices and reception/transmission of large amounts of data.

In an optional embodiment, that the sending unit 301 is further configured to send the first trigger information to the first user equipment includes: sending, by the sending unit 301, a first control message to the first user equipment, where the first control message includes the first trigger information. Optionally, the first control message is sent on a downlink control channel by the sending unit 301 to the first user equipment, and the first control message may be of a new control channel format. For example, a control channel of a user is used to carry trigger information of another user. The base station configures M UEs as a group. In addition, the base station notifies UE of cell radio network temporary identifiers (C-RNTI) of other UEs in the group. For another example, a new control channel format may be defined for the first control message, so that not only scheduling information of an expected user but also trigger information of another user are carried. Cyclic redundancy check (CRC) of this control channel is scrambled by using a C-RNIT of the expected user. For example, when M=3, there are three users in a group. The base station notifies a C-RNTI of each UE to users in the group. The base station sends scheduling of one downlink PDSCH to UE2 by using a PDCCH, and CRC of this PDCCH is scrambled by using a C-RNTI of UE2. Moreover, this control channel not only carries scheduling information of UE2 such as scheduling information in format 1A, but also carries trigger information of UE1 and UE3. For another example, a new control signaling format may be defined for the first control message, and a load of this control signaling is L, where L is a bit quantity of information bits of this control channel before CRC bits are added. For example, the load of this control signaling is the same as that of format 0, and X bits trigger information is allocated to each user. In this control channel, trigger information may be sent to $$N = \left\lfloor \frac{L}{X} \right\rfloor$$

users. In this way, a quantity of control channels is reduced.

In an optional embodiment, the first control message further includes at least one piece of second trigger information, and the at least one piece of second trigger information and the first trigger information are trigger information specific to different user equipments. Specifically, the second trigger information is trigger information that is sent by the sending unit 301 to user equipment different from the first user equipment, and there may be multiple user equipments different from the first user equipment. In this case, the at least one piece of second trigger information is multiple pieces of second trigger information corresponding to the user equipments different from the first user equipment. It may be understood that, the second trigger information is only a name for differing from the first trigger information, and the multiple pieces of second trigger information corresponding to the multiple user equipments different from the first user equipment may be different.

In an optional embodiment, the first trigger information or each of the at least one piece of second trigger information occupies X bits; and a quantity N of the first trigger information or the at least one piece of second trigger information that can be included in the first control message makes the following equation true:

$$N = \left\lfloor \frac{L}{X} \right\rfloor.$$

L is a quantity of bits occupied by information bits of the first control message. In this embodiment, X and L are consistent with those of the embodiment shown in FIG. 2. For details, refer to Table 1 and Table 2.

In an optional embodiment, the first control message further includes at least one piece of second control information; and the transceiver unit is further configured to transceive third data to/from second user equipment according to the second control information. Optionally, the second control information is existing control information, and includes at least one of the resource allocation information, the modulation and coding indication information, the hybrid automatic repeat request process number, the new data indication information, the power control command of the physical uplink control channel, the cyclic shift sequence of the demodulation pilot, the power control command of the physical uplink data channel, the channel quality indicator, or the data channel indication information. Optionally, the second control information is DCI or UCI, and the second control information and the first control information are different control information.

In an optional embodiment, at the same time when the sending unit sends the first trigger information to the first user equipment, the sending unit is further configured to send at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information to the first user equipment, where the new data indication information is used to indicate whether the second data is initially transmitted data, the power control command of the physical uplink control channel is used to indicate power of the physical uplink control channel, and the data channel indication information is used to indicate that the first trigger information is used for the physical uplink data channel or a physical downlink data channel. Optionally, at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information may be sent by the base station to the first user equipment along with the first trigger information by using a same message.

In an optional embodiment, the first trigger information is used to indicate that the transceiver unit 302 transceives the second data to/from the first user equipment according to partial information of the first control information, and the base station further includes: transceiving, by the transceiver unit 302, the second data to/from the first user equipment according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is included in the first trigger information. For example, for $X_{DL}=7$ in Table 1, the first trigger information indicates that the transceiver unit 302 sends the second data to the first user equipment according to partial information of the first control information. The partial information of the first control information is resource allocation information and modulation and coding indication information. The resource allocation information is used to indicate a time frequency resource occupied by the base station to send the first data. Therefore, the base station sends the second data to the first user equipment according to the resource allocation information, the modulation and coding indication information, the hybrid automatic repeat request process number, the new data indication information, and the power control command of the physical uplink control channel. In this case, the resource allocation information and the modulation and coding indication information are included in the first control information. Information such as the hybrid automatic repeat request process number, the new data indication information, and the power control command of the physical uplink control channel is carried in the first trigger information. The first trigger information is not only used to indicate that the partial information is the resource allocation information and the modulation and coding indication information, but also carries the hybrid automatic repeat request process number, the new data indication information, and the power control command of the physical uplink control channel. For another example, for $X_{UL}=8$ in Table 2, the first trigger information indicates that the transceiver unit 302 receives the second data from the first user equipment according to partial information of the first control information. The partial information of the first control information is resource allocation information and modulation and coding indication information. The resource allocation information is used to indicate a time frequency resource occupied by the transceiver unit 302 to receive the first data. Therefore, the transceiver unit 302 receives the second data from the first user equipment according to the resource allocation information, the modulation and coding indication information, the cyclic shift sequence of the demodulation pilot, the new data indication information, the power control command of the physical uplink data channel, and the channel quality indicator. In this case, the resource allocation information and the modulation and coding indication information are included in the first control information. The cyclic shift sequence of the demodulation pilot, the new data indication information, the power control command of the physical uplink data channel, and the channel quality indicator are carried in the first trigger information. The first trigger information is not only used to indicate that the partial information is the resource allocation information and the modulation and coding indication information, but also carries the cyclic shift sequence of the demodulation pilot, the new data indication information, the power control command of the physical uplink data channel, and the channel quality indicator.

In an optional embodiment, the first trigger information is used to indicate that the transceiver unit 302 transceives the second data to/from the first user equipment according to all information of the first control information. Therefore, the transceiver unit 302 transceives the second data to/from the first user equipment according to all information of the first control channel. For example, for $X_{DL}=1$ in Table 1, the first trigger information is used to indicate that the transceiver unit 302 sends the second data to the first user equipment according to all information of the first control information. All information of the first control information is specifically the resource allocation information, the modulation and coding indication information, the hybrid automatic repeat request process number, the new data indication information, and the power control command of the physical uplink control channel. The resource allocation information is used to indicate a time frequency resource occupied by the base station to send the first data. Therefore, the base station sends the second data to the first user equipment according to the resource allocation information, the modulation and coding indication information, the hybrid automatic repeat request process number, the new data indication information, and the power control command of the physical uplink control channel. In this case, the resource allocation information, the modulation and coding indication information, the hybrid automatic repeat request process number, the new data indication information, and the power control command of the physical uplink control channel are all included in the first control channel. For another example, for $X_{UL}=1$ in Table 2, the first trigger information is used to indicate that the transceiver unit 302 receives the second data from the first user equipment according to all information of the first control information. All information of the first control information is specifically the resource allocation information, the modulation and coding indication information, the hybrid automatic repeat request process number, the new data indication information, and the power control command of the physical uplink control channel. The resource allocation information is used to indicate a time frequency resource occupied by the base station to send the first data. Therefore, the transceiver unit 302 receives the second data from the first user equipment according to the resource allocation information, the modulation and coding indication information, the hybrid automatic repeat request process number, the new data indication information, and the power control command of the physical uplink control channel. In this case, the resource allocation information, the modulation and coding indication information, the hybrid automatic repeat request process number, the new data indication information, and the power control command of the physical uplink control channel are all included in the first control channel.

In an optional embodiment, the first trigger information is used to indicate that the transceiver unit 302 transceives the second data to/from the first user equipment according to partial information of the first control information, and the base station further includes: transceiving, by the transceiver unit 302, the second data to/from the first user equipment according to partial information of the first control information and predefined control information of the first control information except the partial information. For example, for $X_{DL}=7$ in Table 1, the first trigger information is used to at least indicate that data indication information is the partial information of the first control channel and is specifically the resource allocation information and the modulation and coding indication information. The resource allocation information is used to indicate a time frequency resource occupied by the base station to send the first data. Therefore, the transceiver unit 302 sends the second data to the first user equipment according to the resource allocation information, the modulation and coding indication information, the predefined hybrid automatic repeat request process number, the predefined new data indication information, and the predefined power control command of the physical uplink control channel. Information such as the hybrid automatic repeat request process number, the new data indication information, and the power control command of the physical uplink control channel is predefined. For another example, for $X_{UL}=7$ in Table 2, the first trigger information is used to at least indicate that data indication information is the partial information of the first control channel and is specifically the resource allocation information and the modulation and coding indication information. The resource allocation information is used to indicate a time frequency resource occupied by the base station to send the first data. Therefore, the transceiver unit 302 receives the second data from the first user equipment according to the resource allocation information, the modulation and coding indication information, the predefined hybrid automatic repeat request process number, the predefined new data indication information, and the predefined power control command of the physical uplink control channel. Information such as the hybrid automatic repeat request process number, the new data indication information, and the power control command of the physical uplink control channel is predefined.

In an optional embodiment, after the sending unit 301 sends the first trigger information to the first user equipment, the sending unit is further configured to: send third control information to the first user equipment, where the third control information is used by the transceiver unit 302 to transceive fourth data to/from the first user equipment according to the third control information. Optionally, for downlink data transmission, the transceiver unit 302 sends the fourth data to the first user equipment according to the third control information; for uplink data transmission, the transceiver unit 302 receives the fourth data from the first user equipment according to the third control information. Optionally, the third control information is existing control information, and includes at least one of the resource allocation information, the modulation and coding indication information, the hybrid automatic repeat request process number, the new data indication information, the power control command of the physical uplink control channel, the cyclic shift sequence of the demodulation pilot, the power control command of the physical uplink data channel, the channel quality indicator, or the data channel indication information.

In an optional embodiment, the first control information is the last piece of control information that is associated with the first trigger information and that is sent by the sending unit 301 to the first user equipment before the sending unit 301 sends the first trigger information to the first user equipment.

In an optional embodiment, the base station further includes: a receiving unit 304, configured to: after the transceiver unit transceives the first data to/from the first user equipment according to the first control information, and before the sending unit sends the first trigger information to the first user equipment, receive an acknowledgement message from the first user equipment, where the acknowledgement message is used to notify the base station that the first user equipment has successfully received the first data according to the first control information. Optionally, the receiving unit 304 and the receiving unit 303 may be a same receiving unit, or may be different receiving units.

In an optional embodiment, the sending unit 301 may be a sender, the transceiver unit 302 may be a transceiver, the transceiver may be a transceiver, and the receiving units 303 and 304 may be receivers. The base station includes a sender and a transceiver. The sender is configured to send first control information to first user equipment. The transceiver is configured to transceive first data to/from the first user equipment according to the first control information. The sender is further configured to send first trigger information to the first user equipment, where the first trigger information is used to indicate that the transceiver transceives second data to/from the first user equipment according to partial information or all information of the first control information.

Figure 4:
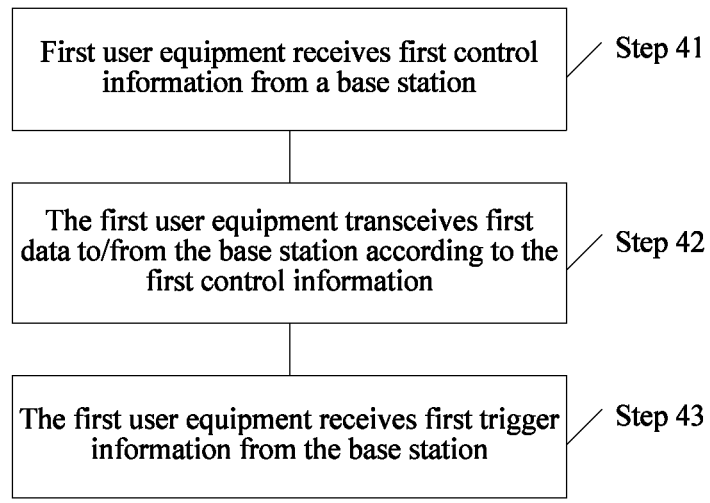
FIG. 4 shows a control information receiving method according to an embodiment of the present invention.

FIG. 4 shows a control information receiving method according to an embodiment of the present invention, and the method includes the following steps.

Step 41. First user equipment receives first control information from a base station. The first control information of this embodiment is the same as that of the embodiment in FIG. 2, and details are not described herein again.

Step 42. The first user equipment transceives first data to/from the base station according to the first control information. Optionally, during downlink data transmission, the first user equipment receives the first data from the base station according to the first control information, that is, DCI; during uplink data transmission, the first user equipment sends the first data to the base station according to the first control information, that is, UCI.

Step 43. The first user equipment receives first trigger information from the base station. The first trigger information is used to instruct the first user equipment to transceive second data to/from the base station according to partial information or all information of the first control information. Optionally, during downlink data transmission, the first trigger information is used to instruct the first user equipment to receive the second data from the base station according to partial information or all information of the first control information; during uplink data transmission, the first trigger information is used to instruct the first user equipment to send the second data to the base station according to partial information or all information of the first control information. Optionally, the first trigger information is used to instruct the first user equipment to transceive the second data to/from the base station according to partial information or all information of the first control information. That is, the first trigger information is used to instruct the first user equipment to transceive the second data to/from the base station according to partial information or all information of the first control information, and which specific information of the first control information the partial information or all information is. Optionally, the second data and the first data are different data. For example, both the first data and the second data are source data that has not been encoded, and the second data and the first data are different source data that has not been encoded.

According to the foregoing solution, the first user equipment receives the first trigger information from the base station, where the first trigger information is used to instruct the first user equipment to transceive the second data to/from the base station according to partial information or all information of the first control information. Therefore, the first user equipment transceives the second data to/from the base station according to partial information or all information of the first control information, that is, when transceiving data to/from the base station, the first user equipment uses the previous control information, and the first trigger information occupies fewer resources than the control information, thereby improving control channel utilization efficiency, so as to satisfy reception/transmission of large quantities of control information caused by connection of large quantities of devices and reception/transmission of large amounts of data.

In an optional embodiment, the receiving, by the first user equipment, first trigger information from the base station includes: receiving, by the first user equipment, a first control message from the base station, where the first control message includes the first trigger information. The first control message is the same as that of the embodiment in FIG. 2, and details are not described herein again.

In an optional embodiment, the first control message further includes at least one piece of second trigger information, and the at least one piece of second trigger information and the first trigger information are trigger information specific to different user equipments. Details are consistent with those of the embodiment in FIG. 2, and are not described herein again.

In an optional embodiment, the first trigger information or each of the at least one piece of second trigger information occupies X bits; and a quantity N of the first trigger information or the at least one piece of second trigger information that can be included in the first control message makes the following equation true:

$$N = \left\lfloor \frac{L}{X} \right\rfloor,$$

where L is a quantity of bits occupied by information bits of the first control message, X is specifically consistent with that of the embodiment in FIG. 2, and details are not described herein again.

In an optional embodiment, the first control message further includes at least one piece of second control information, and second user equipment transceives third data to/from the base station according to the second control information. The second control information of this embodiment is the same as that of the embodiment in FIG. 2, and details are not described herein again.

In an optional embodiment, at the same time of receiving, by the first user equipment, first trigger information from the base station, the method further includes: receiving, by the first user equipment from the base station, at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information. The new data indication information is used to indicate whether the second data is initially transmitted data, the power control command of the physical uplink control channel is used to indicate power of the physical uplink control channel, and the data channel indication information is used to indicate that the trigger indication information is used for the physical uplink data channel or a physical downlink data channel. Optionally, at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information may be sent by the base station to the first user equipment along with the first trigger information by using a same message.

In an optional embodiment, the first trigger information is used to instruct the first user equipment to transceive second data to/from the base station according to partial information of the first control information, and the first user equipment transceives the second data to/from the base station according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is included in the first trigger information. Alternatively, the first user equipment transceives the second data to/from the base station according to partial information of the first control information and predefined control information of the first control information except the partial information. Details are consistent with those of the embodiment in FIG. 2, and are not described herein again.

In an optional embodiment, after the first user equipment receives the first trigger information from the base station, the first user equipment receives third control information from the base station, where the third control information is used by the first user equipment to transceive fourth data to/from the base station according to the third control information. The third control channel of this embodiment is the same as that of the embodiment in FIG. 2, and details are not described herein again.

In an optional embodiment, the first control information is the last piece of control information that is associated with the first trigger information and that is received by the first user equipment from the base station before the first user equipment receives the first trigger information from the base station.

In an optional embodiment, after the first user equipment transceives the first data to/from the base station according to the first control information, and before the first user equipment receives the first trigger information from the base station, the first user equipment sends an acknowledgement message to the base station, where the acknowledgement message is used to notify the base station that the first user equipment has successfully received the first data according to the first control information. Details are consistent with those of the embodiment in FIG. 2, and are not described herein again.

Figure 5:
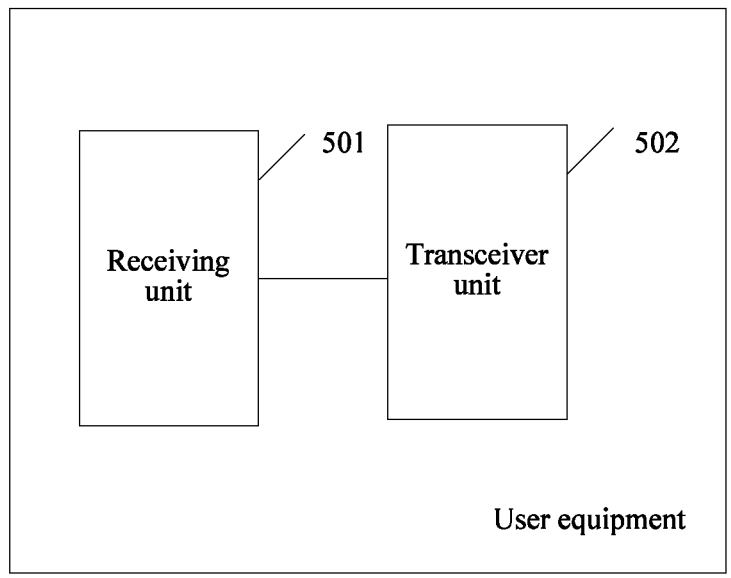
FIG. 5 shows user equipment according to an embodiment of the present invention.

FIG. 5 shows user equipment according to an embodiment of the present invention, configured to perform the method of the embodiment in FIG. 4. The user equipment includes a receiving unit 501 and a transceiver unit 502.

The receiving unit 501 is configured to receive first control information from a base station. The first control information of this embodiment is the same as that of the embodiment in FIG. 4, and details are not described herein again.

The transceiver unit 502 is configured to transceive first data to/from the base station according to the first control information. Optionally, during downlink data transmission, the transceiver unit 502 receives the first data from the base station according to the first control information, that is, DCI. During downlink data transmission, the transceiver unit 502 may be a receiving unit, and this receiving unit may be the receiving unit 501, or may be another receiving unit different from the receiving unit 501. During uplink data transmission, the transceiver unit 502 sends the first data to the base station according to the first control information, that is, UCI. During uplink data transmission, the transceiver unit 502 may be a sending unit 503.

The receiving unit 501 is further configured to receive first trigger information from the base station. The first trigger information is used to instruct the transceiver unit 502 to transceive second data to/from the base station according to partial information or all information of the first control information. Optionally, during downlink data transmission, the first trigger information is used to instruct the transceiver unit 502 to receive the second data from the base station according to partial information or all information of the first control information; during uplink data transmission, the first trigger information is used to instruct the transceiver unit 502 to send the second data to the base station according to partial information or all information of the first control information. Optionally, the first trigger information is used to instruct the transceiver unit 502 to transceive the second data to/from the base station according to partial information or all information of the first control information. That is, the first trigger information is used to instruct the transceiver unit 502 to transceive the second data to/from the base station according to partial information or all information of the first control information, and which specific information of the first control information the partial information or all information is. Optionally, the second data and the first data are different data. For example, both the first data and the second data are source data that has not been encoded, and the second data and the first data are different source data that has not been encoded.

According to the foregoing solution, the receiving unit 501 receives the first trigger information from the base station, where the first trigger information is used to instruct the transceiver unit 502 to transceive second data to/from the base station according to partial information or all information of the first control information. Therefore, the first user equipment transceives the second data to/from the base station according to partial information or all information of the first control information, that is, when transceiving data to/from the base station, the first user equipment uses the previous control information, and the first trigger information occupies fewer resources than the control information, thereby improving control channel utilization efficiency, so as to satisfy reception/transmission of large quantities of control information caused by connection of large quantities of devices and reception/transmission of large amounts of data.

In an optional embodiment, that the receiving unit 501 is further configured to receive the first trigger information from the base station includes: receiving, by the receiving unit 501, a first control message from the base station, where the first control message includes the first trigger information. The first control message is the same as the first control message of the embodiment in FIG. 4, and details are not described herein again.

In an optional embodiment, the first control message further includes at least one piece of second trigger information, and the at least one piece of second trigger information and the first trigger information are trigger information specific to different user equipments. Details are consistent with those of the embodiment in FIG. 4, and are not described herein again.

In an optional embodiment, the first trigger information or each of the at least one piece of second trigger information occupies X bits; and a quantity N of the first trigger information or the at least one piece of second trigger information that can be included in the first control message makes the following equation true:

$$N = \left\lfloor \frac{L}{X} \right\rfloor,$$

where L is a quantity of bits occupied by information bits of the first control message, X is specifically consistent with that of the embodiment in FIG. 4, and details are not described herein again.

In an optional embodiment, the first control message further includes at least one piece of second control information; and second user equipment transceives third data to/from the base station according to the second control information. The second control information of this embodiment is the same as that of the embodiment in FIG. 4, and details are not described herein again.

In an optional embodiment, at the same time when the receiving unit receives the first trigger information from the base station, the receiving unit is further configured to receive, from the base station, at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information. The new data indication information is used to indicate whether the second data is initially transmitted data, the power control command of the physical uplink control channel is used to indicate power of the physical uplink control channel, and the data channel indication information is used to indicate that the first trigger information is used for the physical uplink data channel or a physical downlink data channel. Optionally, at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information may be sent by the base station to the first user equipment along with the first trigger information by using a same message.

In an optional embodiment, the first trigger information is used to instruct the transceiver unit 502 to transceive the second data to/from the base station according to partial information of the first control information, and the user equipment further includes: transceiving, by the transceiver unit 502, the second data to/from the base station according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is included in the first trigger information. Alternatively, the transceiver unit 502 transceives the second data to/from the base station according to partial information of the first control information and predefined control information of the first control information except the partial information. Details are consistent with those of the embodiment in FIG. 4, and are not described herein again.

In an optional embodiment, after the receiving unit 501 receives the first trigger information from the base station, the receiving unit 501 is further configured to receive third control information from the base station, where the third control information is used by the transceiver unit 502 to transceive fourth data to/from the base station according to the third control information. The third control channel of this embodiment is the same as that of the embodiment in FIG. 4, and details are not described herein again.

In an optional embodiment, the first control information is the last piece of control information that is associated with the first trigger information and that is received by the receiving unit 501 from the base station before the receiving unit 501 receives the first trigger information from the base station.

In an optional embodiment, the user equipment further includes: a sending unit 504, configured to: after the transceiver unit transceives the first data to/from the base station according to the first control information, and before the receiving unit receives the first trigger information from the base station, send an acknowledgement message to the base station, where the acknowledgement message is used to notify the base station that the receiving unit 501 has successfully received the first data according to the first control information. Optionally, the sending unit 504 and the sending unit 503 may be a same sending unit, or may be different sending units.

In an optional embodiment, the receiving unit 501 may be a receiver, the transceiver unit 502 may be a transceiver, the transceiver may be a transceiver, and the sending units 503 and 504 may be senders. The user equipment includes a receiver and a transceiver, where the receiver is configured to receive first control information from a base station. The transceiver is configured to transceive first data to/from the base station according to the first control information. The receiver is further configured to receive the first trigger information from the base station, where the first trigger information is used to instruct the transceiver unit to transceive second data to/from the base station according to partial information or all information of the first control information.

Figure 6:
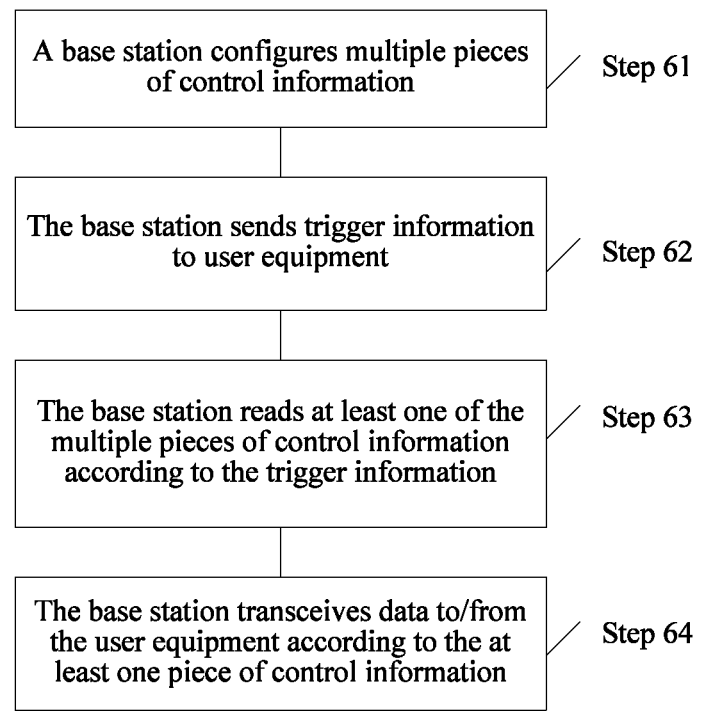
FIG. 6 shows a control information sending method according to an embodiment of the present invention.

FIG. 6 shows a control information sending method according to an embodiment of the present invention, and the method includes the following steps.

Figure 11:
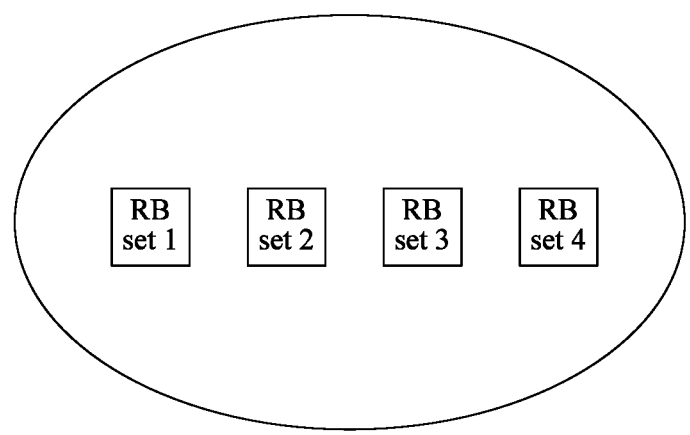
FIG. 11 shows resource block sets according to an embodiment of the present invention.

Step 61. A base station configures multiple pieces of control information. Optionally, the multiple pieces of control information are configured by the base station separately for different user equipments. For example, the base station configures first control information for UE1, configures second control information for UE2, and configures third control information for UE3, and the rest can be deduced by analogy. Alternatively, for example, the base station configures first control information and second control information for UE1, and configures third control information for UE2. Optionally, the multiple pieces of control information are control information configured by the base station for same user equipment. Optionally, the multiple pieces of control information are predefined by the base station to indicate a location of data on a time frequency resource. For example, as shown in FIG. 11, the base station configures four resource block (RB) sets, that is, the base station configures at least one of the four RB sets for user equipment to transmit data.

Step 62. The base station sends trigger information to user equipment. Optionally, the trigger information may be sent on an existing control channel, or may be sent by using a new control channel format.

Step 63. The base station reads at least one of the multiple pieces of control information according to the trigger information, where the at least one piece of control information is used to indicate a location of data on a time frequency resource. Optionally, the base station selects at least one of the four RB sets shown in FIG. 11 according to the trigger information to transmit data. Optionally, a sequence of step 62 and step 63 is not limited.

Step 64. The base station transceives the data to/from the first user equipment according to the at least one piece of control information. During downlink data transmission, the base station sends the data to the first user equipment according to the at least one piece of control information; during uplink data transmission, the base station receives the data from the first user equipment according to the at least one piece of control information.

In this embodiment, the base station configures multiple pieces of control information, control information according to which the base station transceives data to/from the first user equipment is trigger information sent by the base station to the first user equipment, and the base station reads at least one of the multiple pieces of control information according to the trigger information. The trigger information occupies fewer resources than the control information, thereby improving control channel utilization efficiency, so as to satisfy reception/transmission of large quantities of control information caused by connection of large quantities of devices and reception/transmission of large amounts of data.

In an optional embodiment, the trigger information is information of N bits, where N is a natural number. For example, the trigger information is information of 2 bits.

Figure 7:
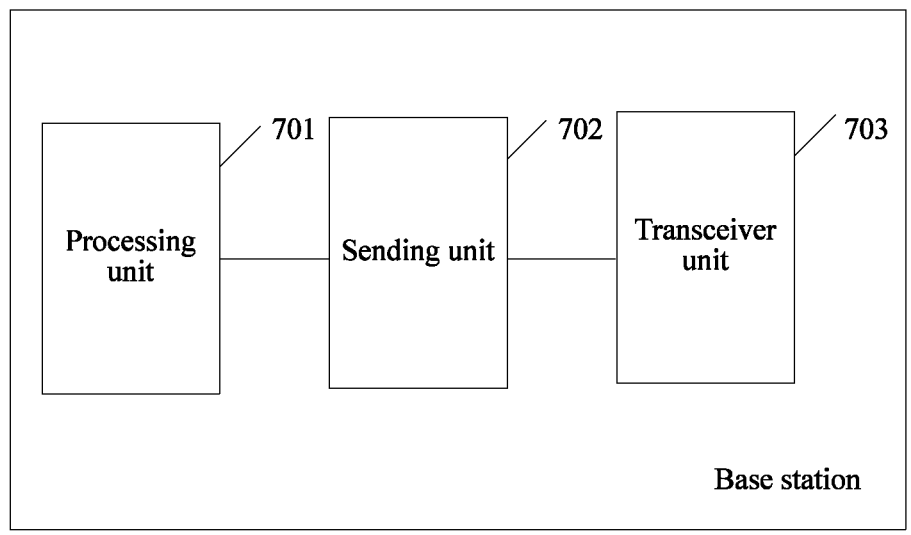
FIG. 7 shows a base station according to an embodiment of the present invention.

FIG. 7 shows a base station according to an embodiment of the present invention, configured to perform the method of the embodiment in FIG. 6. The base station includes a processing unit 701, a sending unit 702, and a transceiver unit 703.

The processing unit 701 is configured to configure multiple pieces of control information. The multiple pieces of control information are configured by the processing unit separately for different user equipments. For example, the base station configures first control information for UE1, configures second control information for UE2, and configures third control information for UE3, and the rest can be deduced by analogy. Alternatively, for example, the base station configures first control information and second control information for UE1, and configures third control information for UE2. Optionally, the multiple pieces of control information are predefined by the base station to indicate a location of data on a time frequency resource. For example, as shown in FIG. 11, the base station configures four RB sets, that is, the base station configures at least one of the four RB sets for user equipment to transmit data. The sending unit 702 is configured to send trigger information to user equipment. The processing unit 701 is further configured to read at least one of the multiple pieces of control information according to the trigger information, where the at least one piece of control information is used to indicate a location of data on a time frequency resource. The transceiver unit 703 is configured to transceive the data to/from the first user equipment according to the at least one piece of control information. During downlink data transmission, the transceiver unit 703 is configured to send the data to the first user equipment according to the at least one piece of control information. In this case, the transceiver unit 703 is a sending unit 704. Optionally, the sending unit 704 and the sending unit 702 are a same sending unit. During uplink data transmission, the transceiver unit 703 is configured to receive the data from the first user equipment according to the at least one piece of control information. In this case, the transceiver unit 703 is a receiving unit 705. Optionally, the trigger information may be sent on an existing control channel, or may be sent by using a new control channel format. Optionally, the base station selects at least one of the four RB sets shown in FIG. 11 according to the trigger information to transmit data.

In this embodiment, the processing unit 701 configures multiple pieces of control information, control information according to which the transceiver unit 703 transceives data to/from the first user equipment is trigger information sent by the base station to the first user equipment, and the processing unit 701 reads at least one of the multiple pieces of control information according to the trigger information. The trigger information occupies fewer resources than the control information, thereby improving control channel utilization efficiency, so as to satisfy reception/transmission of large quantities of control information caused by connection of large quantities of devices and reception/transmission of large amounts of data.

In an optional embodiment, the trigger information is information of N bits, where N is a natural number. For example, the trigger information is information of 2 bits.

In an optional embodiment, the processing unit 701 may be a processor, the sending unit 702 may be a sender, the sender may be replaced with a transceiver, and the transceiver unit 703 may be a transceiver. The base station includes a processor, configured to configure multiple pieces of control information. The sender is configured to send trigger information to user equipment, where the trigger information is used by the processing unit to read at least one of the multiple pieces of control information according to the trigger information, where the at least one piece of control information is used to indicate a location of data on a time frequency resource. The transceiver is configured to transceive the data to/from the first user equipment according to the at least one piece of control information.

Figure 8:
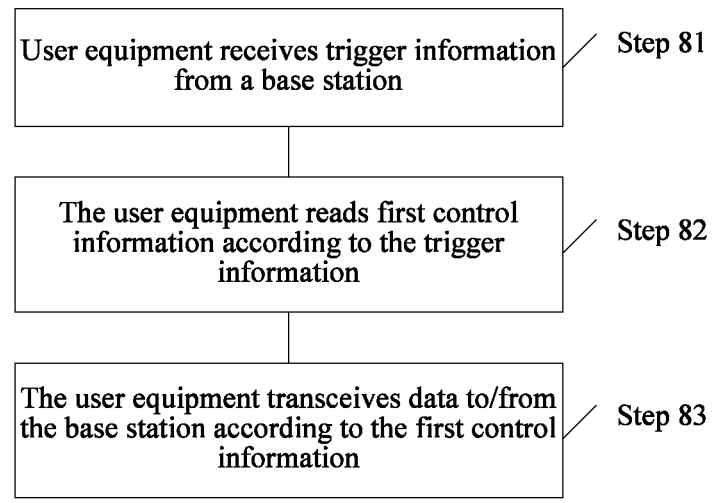
FIG. 8 shows a control information receiving method according to an embodiment of the present invention.

FIG. 8 shows a control information receiving method according to an embodiment of the present invention, and the method includes the following steps.

Step 81. User equipment receives trigger information from a base station. Optionally, the trigger information may be sent on an existing control channel, or may be sent by using a new control channel format.

Step 82. The user equipment reads first control information according to the trigger information, where the first control information is at least one of multiple pieces of control information that is configured by the base station, and the at least one piece of control information is used to indicate a location of data on a time frequency resource. Optionally, the multiple pieces of control information are configured by the base station separately for different user equipments. For example, the base station configures first control information for UE1, configures second control information for UE2, and configures third control information for UE3, and the rest can be deduced by analogy. Alternatively, for example, the base station configures first control information and second control information for UE1, and configures third control information for UE2. Optionally, the multiple pieces of control information are control information configured by the base station for same user equipment. Optionally, the multiple pieces of control information are predefined by the base station to indicate a location of data on a time frequency resource. For example, as shown in FIG. 11, the base station configures four RB sets, that is, the base station configures at least one of the four RB sets for user equipment to transmit data.

Step 83. The user equipment transceives the data to/from the base station according to the first control information. During downlink data transmission, the user equipment receives the data from the base station according to the first control information; during uplink data transmission, the user equipment sends the data to the base station according to the first control information. Optionally, the base station selects at least one of the four RB sets shown in FIG. 11 according to the trigger information to transmit data.

In this embodiment, the base station configures multiple pieces of control information, control information according to which the user equipment transceives data to/from the base station is trigger information sent by the base station to the first user equipment, and the base station reads at least one of the multiple pieces of control information according to the trigger information. The trigger information occupies fewer resources than the control information, thereby improving control channel utilization efficiency, so as to satisfy reception/transmission of large quantities of control information caused by connection of large quantities of devices and reception/transmission of large amounts of data.

In an optional embodiment, the trigger information is information of N bits, where N is a natural number. For example, the trigger information is information of 2 bits.

Figure 9:
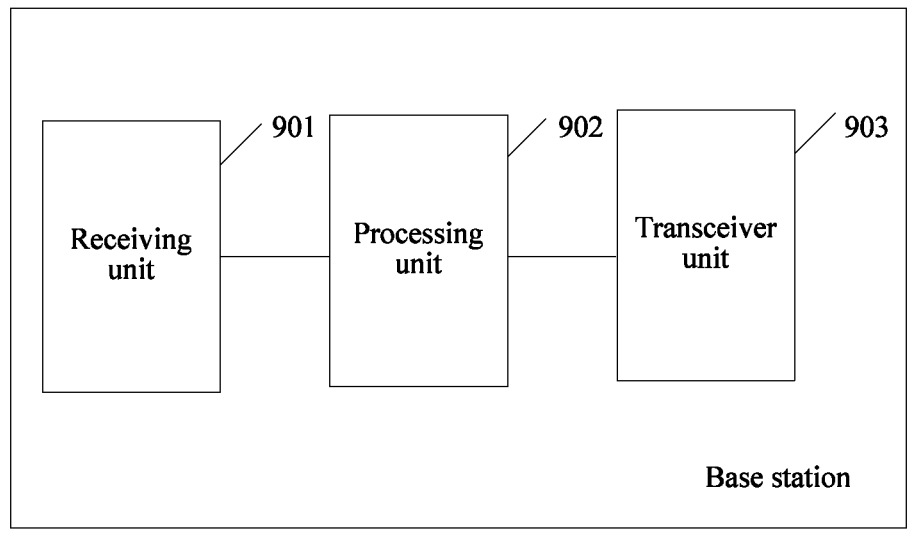
FIG. 9 shows user equipment according to an embodiment of the present invention.

FIG. 9 shows user equipment according to an embodiment of the present invention, configured to perform the method of the embodiment in FIG. 8. The user equipment includes a receiving unit 901, a processing unit 902, and a transceiver unit 903.

The receiving unit 901 is configured to receive trigger information from a base station. The processing unit 902 is configured to read first control information according to the trigger information, where the first control information is at least one of multiple pieces of control information that is configured by the base station, and the at least one piece of control information is used to indicate a location of data on a time frequency resource. The transceiver unit 903 is configured to transceive the data to/from the base station according to the first control information. During downlink data transmission, the transceiver unit 903 is configured to receive the data from the base station according to the first control information. In this case, the transceiver unit 903 is a receiving unit 904. Optionally, the receiving unit 904 and the receiving unit 901 are a same receiving unit. During uplink data transmission, the transceiver unit 903 is configured to send the data to the base station according to the first control information. In this case, the transceiver unit 903 is a sending unit 905. Optionally, the trigger information may be sent on an existing control channel, or may be sent by using a new control channel format. Optionally, the multiple pieces of control information are configured by the base station separately for different user equipments. For example, the base station configures first control information for UE1, configures second control information for UE2, and configures third control information for UE3, and the rest can be deduced by analogy. Alternatively, for example, the base station configures first control information and second control information for UE1, and configures third control information for UE2. Optionally, the multiple pieces of control information are control information configured by the base station for same user equipment. Optionally, the multiple pieces of control information are predefined by the base station to indicate a location of data on a time frequency resource. For example, as shown in FIG. 11, the base station configures four RB sets, that is, the base station configures at least one of the four RB sets for user equipment to transmit data. Optionally, the base station selects at least one of the four RB sets shown in FIG. 11 according to the trigger information to transmit data.

In this embodiment, the base station configures multiple pieces of control information, control information according to which the transceiver unit 903 transceives data to/from the base station is trigger information sent by the base station to the first user equipment, and the base station reads at least one of the multiple pieces of control information according to the trigger information. The trigger information occupies fewer resources than the control information, thereby improving control channel utilization efficiency, so as to satisfy reception/transmission of large quantities of control information caused by connection of large quantities of devices and reception/transmission of large amounts of data.

In an optional embodiment, the trigger information is information of N bits, where N is a natural number. For example, the trigger information is information of 2 bits.

In an optional embodiment, the receiving unit 901 may be a receiver, the receiver may be replaced with a transceiver, the processing unit 902 may be a processor, and the transceiver unit 903 may be a transceiver. The user equipment includes a receiver, a processor, and a transceiver. The receiver is configured to receive trigger information from a base station. The processor is configured to read first control information according to the trigger information, where the first control information is at least one of multiple pieces of control information that is configured by the base station, and the first control information is used to indicate a location of data on a time frequency resource. The transceiver unit 903 is configured to transceive the data to/from the base station according to the first control information.

An embodiment of the present invention is described in more details below with reference to a specific example.

Figure 10:
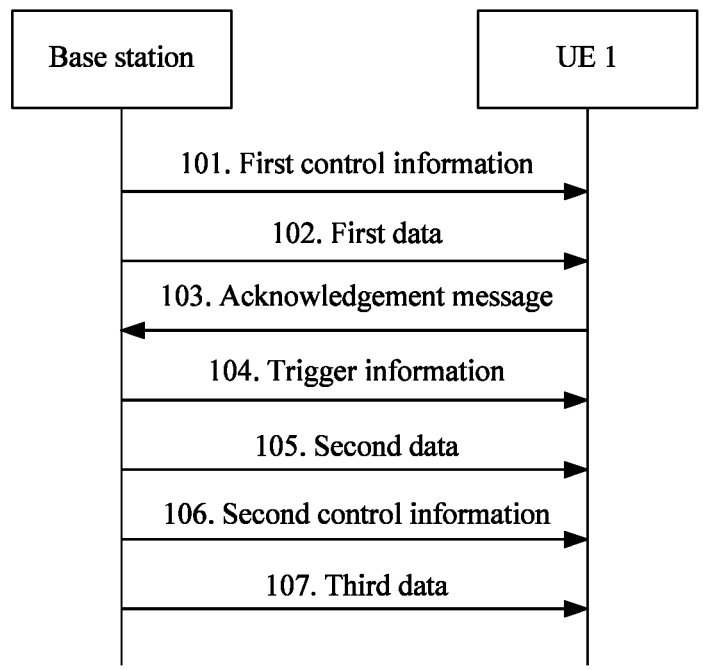
FIG. 10 shows a control information transmission method during downlink data transmission according to an embodiment of the present invention.

FIG. 10 shows a control information transmission method during downlink data transmission according to an embodiment of the present invention, and the method includes the following specific steps.

Step 101. A base station sends first control information to UE1, and UE1 receives the first control information. Optionally, the first control information is an existing control channel, and includes at least one of resource allocation information, modulation and coding indication information, a hybrid automatic repeat request process number, new data indication information, a power control command of a physical uplink control channel, a cyclic shift sequence of a demodulation pilot, a power control command of a physical uplink data channel, a channel quality indicator, or data channel indication information. For example, a control channel for downlink data transmission in format 1A in LTE Release 8 includes the following information bits:

1 bit as a format 0/format 1A distinguishing flag, where 0 indicates format 0, and 1 indicates format 1A;

1 bit as a centralized/distributed resource allocation flag, where 0 indicates centralized resource allocation, and 1 indicates distributed resource allocation;

$\lceil \log_2(N_{RB}^{DL}(N_{RB}^{DL}+1)/2)\rceil$ bite resource allocation information;

5 bits modulation and coding indication information;

3 bits as a hybrid automatic repeat request process number;

1 bit new data indication information;

2 bits redundancy version information; and 2 bits as a power control command of a physical uplink control channel.

A control channel for uplink data transmission in format 0 in LTE Release 8 includes the following information bits:

1 bit as a format 0/format 1A distinguishing flag, where 0 indicates format 0, and 1 indicates format 1A;

1 bit frequency hopping flag information of a physical uplink data channel;

$\lceil \log_2(N_{RB}^{DL}(N_{RB}^{DL}+1)/2)\rceil$ bite resource allocation information;

5 bits modulation and coding indication information;

1 bit new data indication information;

2 bits as a power control command of the physical uplink data channel;

3 bits cyclic shift of a demodulation pilot; and 1 bit channel quality indicator information.

Step 102. The base station sends first data to UE1 according to the first control information, and UE1 receives the first data according to the first control information.

Step 103. UE1 sends an acknowledgement message to the base station, and the base station receives the acknowledgement message from UE1. The acknowledgement message is used by UE1 to notify the base station that UE1 has received the first data successfully according to the first control channel. Optionally, UE1 stores the first control channel at any time point after step 101 and before step 104. Optionally, UE1 sends the acknowledgement message to the base station only during downlink data transmission, and during uplink data transmission, UE1 does not need to send the acknowledgement message to the base station. Optionally, step 103 is not indispensable, that is, step 104 is directly performed after step 102.

Step 104. The base station sends first trigger information to UE1, and UE1 receives the first trigger information. The first trigger information is sent to UE1 after the base station receives the acknowledgement message, where the first trigger information is used to indicate that the base station transceives second data to/from the first user equipment according to partial information or all information of the first control information.

Step 105. The base station sends the second data to UE1 according to partial information or all information of the first control information, and UE1 receives the second data from the base station according to partial information or all information of the first control information.

According to the foregoing solution, the base station sends the first trigger information to the user equipment. Optionally, the first trigger information is sent to UE1 after the base station receives the acknowledgement message, where the first trigger information is used to indicate that the base station transceives second data to/from the first user equipment according to partial information or all information of the first control information. Therefore, the base station sends the second data to UE1 according to information about the first control channel, that is, when sending new data, the base station uses the previous control channel, and resources occupied by the first trigger information are less than resources occupied by the control channel, thereby improving control channel utilization efficiency, so as to satisfy reception/transmission of large quantities of control information caused by connection of large quantities of devices and reception/transmission of large amounts of data.

In an optional embodiment, the sending, by the base station, first trigger information to UE1 includes: sending, by the base station, a first control message to UE1, where the first control message includes the first trigger information. Optionally, the first control message is sent on a downlink control channel by the base station to the first user equipment, and the first control message may be of a new control channel format. For example, a control channel of a user is used to carry trigger information of another user. The base station configures M UEs as a group. In addition, the base station notifies UE of cell-radio network temporary identifiers (C-RNTI) of other UEs in the group. For another example, a new control channel format may be defined for the first control message, so that not only scheduling information of an expected user but also trigger information of another user are carried. Cyclic redundancy check (CRC) of this control channel is scrambled by using a C-RNIT of the expected user. For example, when M=3, there are three users in a group. The base station notifies a C-RNTI of each UE to users in the group, the base station sends scheduling of one downlink PDSCH to UE2 by using a PDCCH, and CRC of this PDCCH is scrambled by using a C-RNTI of UE2. Moreover, this control channel not only carries scheduling information of UE2 such as scheduling information in format 1A, but also carries trigger information of UE1 and UE3. For another example, a new control signaling format may be defined for the first control message, and a load of this control signaling is L, where L is a bit quantity of information bits of this control channel before CRC bits are added. For example, the load of this control signaling is the same as that of format 0, and X bits trigger information is allocated to each user. In this control channel, trigger information may be sent to $$N = \left\lfloor \frac{L}{X} \right\rfloor$$

users. In this way, a quantity of control channels is reduced.

In an optional embodiment, the first control message further includes at least one piece of second trigger information, and the at least one piece of second trigger information and the first trigger information are trigger information specific to different user equipments. Specifically, the second trigger information is trigger information that is sent by the base station to user equipment different from UE1, and there may be multiple user equipments such as UE2 and UE3 different from the first user equipment. In this case, the at least one piece of second trigger information is multiple pieces of second trigger information corresponding to the user equipments different from UE1. It may be understood that, the second trigger information is only a name for differing from the first trigger information, and the multiple pieces of second trigger information corresponding to UE2, UE3, and the like different from UE1 may be different. For example, trigger information 1 corresponding to UE1, trigger information 2 corresponding to UE2, and trigger information 3 corresponding to UE3 may be different.

In an optional embodiment, the first trigger information or the at least one piece of second trigger information occupies X bits; and a quantity N of the first trigger information or the at least one piece of second trigger information that can be included in the first control message makes the following equation true:

$$N = \left\lfloor \frac{L}{X} \right\rfloor.$$

L is a quantity of bits occupied by information bits of the first control message. For example, Table 3 shows a case in which the first trigger information or the at least one piece of second trigger information occupies $X_{DL}$ bits during downlink data transmission.

TABLE 3

|  | $x_{DL} = 7$ | $x_{DL} = 5$ | $x_{DL} = 2$ | $x_{DL} = 1$ |
| --- | --- | --- | --- | --- |
| Trigger indication information | 1 bit, to indicate whether a PDSCH is transmitted or indicate that the data indication information is partial information or all information of the first control channel | 1 bit, to indicate whether a PDSCH is transmitted or indicate that the data indication information is partial information or all information of the first control channel | 1 bit, to indicate whether a PDSCH is transmitted or indicate that the data indication information is partial information or all information of the first control channel | 1 bit, to indicate whether a PDSCH is transmitted or indicate that the data indication information is partial information or all information of the first control channel |

TABLE 3-continued

| | $x_{DL} = 7$ | $x_{DL} = 5$ | $x_{DL} = 2$ | $x_{DL} = 1$ |
|---|---|---|---|---|
| Hybrid automatic repeat request process number | 3 bits | 3 bits | None | None |
| New data indication information | 1 bit | 1 bit | 1 bit | None |
| Power control command of a physical uplink control channel | 2 bits | None | None | None |

In an optional embodiment, the first control message further includes at least one piece of second control information, and the base station sends third data to UE2 according to the second control information. Optionally, the second control information is an existing control channel, and includes at least one of the resource allocation information, the modulation and coding indication information, the hybrid automatic repeat request process number, the new data indication information, the power control command of the physical uplink control channel, the cyclic shift sequence of the demodulation pilot, the power control command of the physical uplink data channel, the channel quality indicator, or the data channel indication information. Optionally, the second control information and the first control information are different control information.

In an optional embodiment, at the same time when the base station sends the first trigger information to the first user equipment, the base station sends at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information to the first user equipment. Optionally, the first trigger information is used to indicate that the base station transceives second data to/from the first user equipment according to partial information or all information of the first control information, and which specific information of the first control channel the partial information or all information is. The new data indication information is used to indicate whether the second data is initially transmitted data, the power control command of the physical uplink control channel is used to indicate power of the physical uplink control channel, and the data channel indication information is used to indicate that the trigger indication information is used for the physical uplink data channel or a physical downlink data channel. Optionally, at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information may be sent by the base station to the first user equipment along with the first trigger information by using a same message.

In an optional embodiment, the first trigger information is used to indicate that the base station transceives second data to/from UE1 according to partial information of the first control information. The first trigger information further includes at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information. Therefore, the base station sends the second data to UE1 according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information. For example, for $X_{DL}=7$ in Table 3, the partial information of the first control information according to which the base station transceives the second data to/from the first user equipment as indicated by the first trigger information is resource allocation information and modulation and coding indication information. The resource allocation information is used to indicate a time frequency resource occupied by the base station to send the first data. Therefore, the base station sends the second data to UE1 according to the resource allocation information, the modulation and coding indication information, and the hybrid automatic repeat request process number, the new data indication information, and the power control command of the physical uplink control channel that are carried in the first trigger information. In this case, the resource allocation information and the modulation and coding indication information are included in the first control information. Information such as the hybrid automatic repeat request process number, the new data indication information, and the power control command of the physical uplink control channel is carried in the first trigger information, and the first trigger information not only indicates that the partial information of the first control information according to which the base station transceives the second data to/from the first user equipment is the resource allocation information and the modulation and coding indication information, but also carries the hybrid automatic repeat request process number, the new data indication information, and the power control command of the physical uplink control channel.

In an optional embodiment, the first trigger information is used to indicate that the base station transceives second data to/from UE1 according to all information of the first control channel. The base station sends the second data to UE1 according to all information of the first control channel. For example, for $X_{DL}=1$ in Table 3, all information of the first control information according to which the base station transceives the second data to/from UE1 as indicated by the first trigger information is the resource allocation information, the modulation and coding indication information, the hybrid automatic repeat request process number, the new data indication information, and the power control command of the physical uplink control channel. The resource allocation information is used to indicate a time frequency resource occupied by the base station to send the first data. Therefore, the base station sends the second data to UE1 according to the resource allocation information, the modulation and coding indication information, the hybrid automatic repeat request process number, the new data indication information, and the power control command of the physical uplink control channel. In this case, the resource allocation information, the modulation and coding indication information, the hybrid automatic repeat request process number, the new data indication information, and the power control command of the physical uplink control channel are all included in the first control channel. The first trigger information is used to only indicate that the base station transceives second data to/from UE1 according to all information of the first control information, and the data indication information according to which the base station sends the second data to UE1 as indicated by the first trigger information is all information of the first control channel.

In an optional embodiment, the first trigger information is used to indicate that the base station transceives second data to/from UE1 according to partial information of the first control information, and the base station sends the second data to UE1 according to partial information of the first control channel and predefined control information of the first control channel except the partial information. For example, for $X_{DL}=7$ in Table 3, the first trigger information is used to indicate that the base station sends the second data to UE1 according to the partial information of the first control information according to which the base station transceives the second data to/from the first user equipment, and according to the predefined hybrid automatic repeat request process number, the predefined new data indication information, and the predefined power control command of the physical uplink control channel. The partial information of the first control channel is specifically the resource allocation information and the modulation and coding indication information. The resource allocation information is used to indicate a time frequency resource occupied by the base station to send the first data. Therefore, the base station sends the second data to UE1 according to the resource allocation information, the modulation and coding indication information, the predefined hybrid automatic repeat request process number, the predefined new data indication information, and the predefined power control command of the physical uplink control channel. Information such as the hybrid automatic repeat request process number, the new data indication information, and the power control command of the physical uplink control channel is predefined.

In an optional embodiment, the method of the embodiment in FIG. 10 further includes: after the base station sends the first trigger information to UE1, sending, by the base station, third control information to UE1, where the third control information is used by the base station to send fourth data according to the third control information. The third control information is an existing control channel, and includes at least one of the resource allocation information, the modulation and coding indication information, the hybrid automatic repeat request process number, the new data indication information, the power control command of the physical uplink control channel, the cyclic shift sequence of the demodulation pilot, the power control command of the physical uplink data channel, the channel quality indicator, or the data channel indication information.

In an optional embodiment, the first control information is the last piece of control information that is associated with the first trigger information and that is sent by the base station to UE1 before the base station sends the first trigger information to UE1.

In an optional embodiment, after the base station transceives the first data to/from UE1 according to the first control information, and before the base station sends the first trigger information to UE1, the method further includes: receiving, by the base station, an acknowledgement message from UE1, where the acknowledgement message is used by UE1 to notify the base station that UE1 has successfully received the first data according to the first control information.

In the embodiment in FIG. 10, downlink data transmission is performed, but the embodiment in FIG. 10 is also applicable to uplink data transmission. A difference between uplink data transmission and downlink data transmission lies in whether the base station sends data to the user equipment or receives data from the user equipment according to control information or data indication information. Trigger information and the like in uplink transmission are similar to those in downlink transmission, and details are not described herein again.

Moreover, when no conflict occurs, the embodiments in the present invention and the features in the embodiments may be combined with each other.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
  receiving, by a first user equipment, first control information from a base station;
  transceiving, by the first user equipment, first data to and from the base station according to the first control information; and
  receiving, by the first user equipment, a first control message from the base station,
  wherein the first control message comprises first trigger information and at least one piece of second trigger information,
  wherein the first trigger information instructs the first user equipment to transceive second data to and from the base station according to partial information or all information of the first control information,
  wherein the at least one piece of second trigger information and the first trigger information are specific to different user equipments,
  wherein the first trigger information or the at least one piece of second trigger information occupies X bits,
  wherein a quantity N of the first trigger information or the at least one piece of second trigger information in the first control message makes the following equation true:

$$N = \left\lfloor \frac{L}{X} \right\rfloor,$$

and
wherein L is a quantity of bits occupied by information bits of the first control message.

2. The method according to claim 1, wherein the first control message further comprises at least one piece of second control information; and
wherein a second user equipment transceives third data to and from the base station according to the at least one piece of second control information.

3. The method according to claim 1, wherein at the same time as receiving, by the first user equipment, the first trigger information from the base station, the method further comprises:
receiving, by the first user equipment from the base station, at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information,
wherein the new data indication information indicates whether the second data is initially transmitted data,
wherein the power control command of the physical uplink control channel indicates power of the physical uplink control channel, and
wherein the data channel indication information indicates that the first trigger information is used for the physical uplink data channel or a physical downlink data channel.

4. The method according to claim 3, further comprising:
transceiving, by the first user equipment, the second data to and from the base station according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is comprised in the first trigger information; or
transceiving, by the first user equipment, the second data to and from the base station according to the partial information of the first control information and predefined control information of the first control information, wherein the predefined control information does not include the partial information of the first control information.

5. The method according to claim 1, further comprising:
receiving, by the first user equipment, third control information from the base station after receiving the first trigger information from the base station, wherein the third control information is used by the first user equipment to transceive fourth data to and from the base station according to the third control information.

6. The method according to claim 1, wherein the first control information is a last piece of control information that is associated with the first trigger information and that is received by the first user equipment from the base station before the first user equipment receives the first trigger information from the base station.

7. The method according to claim 1, further comprising:
sending, by the first user equipment, an acknowledgement message to the base station after transceiving the first data to and from the base station according to the first control information, and before receiving the first trigger information from the base station, wherein the acknowledgement message notifies the base station that the first user equipment has successfully received the first data according to the first control information.

8. A method comprising:
receiving, by a first user equipment, first control information from a base station;
transceiving, by the first user equipment, first data to and from the base station according to the first control information; and
receiving, by the first user equipment, first trigger information from the base station, wherein the first trigger information instructs the first user equipment to transceive second data to and from the base station according to partial information or all information of the first control information,
wherein the first user equipment receives at the same time as the first trigger information at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information,
wherein the new data indication information indicates whether the second data is initially transmitted data,
wherein the power control command of the physical uplink control channel indicates power of the physical uplink control channel, and
wherein the data channel indication information indicates that the first trigger information is used for the physical uplink data channel or a physical downlink data channel.

9. The method according to claim 8, wherein receiving the first trigger information from the base station comprises receiving a first control message from the base station, wherein the first control message comprises the first trigger information.

10. The method according to claim 9, wherein the first control message further comprises at least one piece of second trigger information, and the at least one piece of second trigger information and the first trigger information are specific to different user equipments.

11. The method according to claim 9, wherein the first control message further comprises at least one piece of second control information, and wherein a second user equipment transceives third data to and from the base station according to the at least one piece of second control information.

12. The method according to claim 8, further comprising:
transceiving, by the first user equipment, the second data to and from the base station according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is comprised in the first trigger information, or
transceiving, by the first user equipment, the second data to and from the base station according to the partial information of the first control information and predefined control information of the first control information, wherein the predefined control information does not include the partial information of the first control information.

13. The method according to claim 8, further comprising receiving, by the first user equipment, third control information from the base station after receiving the first trigger information from the base station, wherein the third control information is used by the first user equipment to transceive fourth data to and from the base station according to the third control information.

14. The method according to claim 8, wherein the first control information is a last piece of control information that is associated with the first trigger information and that is received by the first user equipment from the base station before the first user equipment receives the first trigger information from the base station.

15. The method according to claim 8, further comprising sending, by the first user equipment, an acknowledgement message to the base station after transceiving the first data to and from the base station according to the first control information, and before receiving the first trigger information from the base station, wherein the acknowledgement message notifies the base station that the first user equipment has successfully received the first data according to the first control information.

16. A method comprising:
receiving, by a first user equipment, first control information from a base station;
transceiving, by the first user equipment, first data to and from the base station according to the first control information; and
receiving, by the first user equipment, first trigger information from the base station, wherein the first trigger information instructs the first user equipment to transceive second data to and from the base station according to partial information or all information of the first control information,
wherein the first control information is a last piece of control information that is associated with the first trigger information and that is received by the first user equipment from the base station before the first user equipment receives the first trigger information from the base station.

17. The method according to claim 16, wherein receiving, by the first user equipment, the first trigger information from the base station comprises receiving, by the first user equipment, a first control message from the base station, wherein the first control message comprises the first trigger information.

18. The method according to claim 16,
wherein the first user equipment receives at the same time as the first trigger information at least one of a hybrid automatic repeat request process number, new data indication information, a power control command of a physical uplink control channel, a cyclic shift sequence of a demodulation pilot, a power control command of a physical uplink data channel, a channel quality indicator, or data channel indication information,
wherein the new data indication information indicates whether the second data is initially transmitted data,
wherein the power control command of the physical uplink control channel indicates power of the physical uplink control channel, and
wherein the data channel indication information indicates that the first trigger information is used for the physical uplink data channel or a physical downlink data channel.

19. The method according to claim 18, further comprising:
transceiving, by the first user equipment, the second data to and from the base station according to partial information of the first control information and at least one of the hybrid automatic repeat request process number, the new data indication information, the power control command of the physical uplink control channel, the cyclic shift sequence of the demodulation pilot, the power control command of the physical uplink data channel, the channel quality indicator, or the data channel indication information that is comprised in the first trigger information; or
transceiving, by the first user equipment, the second data to and from the base station according to the partial information of the first control information and predefined control information of the first control information, wherein the predefined control information does not include the partial information of the first control information.

20. The method according to claim 16, further comprising receiving, by the first user equipment, third control information from the base station after receiving the first trigger information from the base station, wherein the third control information is used by the first user equipment to transceive fourth data to and from the base station according to the third control information.

* * * * *